United States Patent
Brozyna et al.

(10) Patent No.: US 10,533,440 B2
(45) Date of Patent: Jan. 14, 2020

(54) TURBINE NOZZLE AIRFOIL PROFILE

(71) Applicant: General Electric Company, Schenectady, NY (US)

(72) Inventors: Lee Larned Brozyna, Mauldin, SC (US); Daniel Robert Burnos, Greer, SC (US); Pradeep Ghute, Parbhani (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 346 days.

(21) Appl. No.: 15/594,708

(22) Filed: May 15, 2017

(65) Prior Publication Data
US 2018/0328196 A1 Nov. 15, 2018

(51) Int. Cl.
*F01D 9/04* (2006.01)
*F01D 5/14* (2006.01)

(52) U.S. Cl.
CPC .............. *F01D 9/041* (2013.01); *F01D 5/141* (2013.01); *F01D 5/142* (2013.01); *F01D 5/143* (2013.01); *F05D 2250/75* (2013.01)

(58) Field of Classification Search
CPC .......... F01D 9/041; F01D 5/147; F01D 5/148; F01D 1/10; F01D 5/143; F01D 5/12; F01D 5/14; F01D 9/02; F05D 2200/32; F05D 2220/30
See application file for complete search history.

(56) References Cited

U.S. PATENT DOCUMENTS

| | | |
|---|---|---|
| 6,503,054 B1 | 1/2003 | Bielek et al. |
| 6,685,434 B1 | 2/2004 | Humanchuk et al. |
| 6,736,599 B1 | 5/2004 | Jacks et al. |
| 6,739,838 B1 | 5/2004 | Bielek et al. |
| 6,779,980 B1 | 8/2004 | Brittingham et al. |
| 7,527,473 B2 | 5/2009 | Humanchuk et al. |
| 7,731,483 B2 | 6/2010 | DeLong et al. |
| 8,070,428 B2 | 12/2011 | Bielek et al. |
| 8,313,291 B2 | 11/2012 | Mariotti et al. |
| 8,714,930 B2 | 5/2014 | Herzlinger et al. |
| 8,807,950 B2 | 8/2014 | Bielek et al. |
| 8,814,511 B2 | 8/2014 | Check et al. |
| 9,322,282 B2 | 4/2016 | Chouhan et al. |
| 2014/0015081 A1 | 1/2014 | Luhta et al. |

*Primary Examiner* — Charles G Freay
*Assistant Examiner* — Lilya Pekarskaya
(74) *Attorney, Agent, or Firm* — Dority & Manning, P.A.

(57) ABSTRACT

The present application provides a turbine nozzle including an airfoil shape. The airfoil shape may have a nominal profile substantially in accordance with Cartesian coordinate values of X, Y and Z set forth in Table I. The Cartesian coordinate values of X, Y and Z are non-dimensional values from 0% to 100% convertible to dimensional distances in inches by multiplying the Cartesian coordinate values of X, Y and Z by a height of the airfoil in inches. The X and Y values, when connected by smooth continuing arcs, define airfoil profile sections at each distance Z. The airfoil profile sections at Z distances may be joined smoothly with one another to form a complete airfoil shape.

18 Claims, 2 Drawing Sheets

US 10,533,440 B2

TURBINE NOZZLE AIRFOIL PROFILE

FIELD

The present application relates generally to a turbine nozzle for a gas turbine engine, and more particularly relates to a turbine nozzle airfoil profile for a turbine nozzle.

BACKGROUND

Some aircraft and/or power plant systems, for example certain jet aircraft, nuclear, simple cycle and combined cycle power plant systems, employ turbines (also referred to as turbomachines) in their design and operation. Some of these turbines employ airfoils (e.g., stator vanes or nozzles and rotor blades.) which during operation are exposed to fluid flows. These airfoils are configured to aerodynamically interact with the fluid flows and generate energy (e.g., creating thrust, turning kinetic energy to mechanical energy, thermal energy to mechanical energy, etc.) from these fluid flows as part of power generation. As a result of this interaction and conversion, the aerodynamic characteristics and losses of these airfoils have an impact on system and turbine operation, performance, thrust, efficiency, and power.

BRIEF DESCRIPTION

Aspects and advantages are set forth below in the following description, or may be obvious from the description, or may be learned through practice.

The present application provides a turbine nozzle including an airfoil shape. The airfoil shape may have a nominal profile substantially in accordance with Cartesian coordinate values of X, Y and Z set forth in Table I. The Cartesian coordinate values of X, Y and Z are non-dimensional values from 0% to 100% convertible to dimensional distances in inches by multiplying the Cartesian coordinate values of X, Y and Z by a height of the airfoil in inches. The X and Y values, when connected by smooth continuing arcs, define airfoil profile sections at each distance Z. The airfoil profile sections at Z distances being joined smoothly with one another to form a complete airfoil shape.

The present application further provides a turbine nozzle including an airfoil having a suction-side uncoated nominal airfoil profile substantially in accordance with suction-side Cartesian coordinate values of X, Y and Z set forth in Table I. The Cartesian coordinate values of X, Y and Z are non-dimensional values from 0% to 100% convertible to dimensional distances in inches by multiplying the Cartesian coordinate values of X, Y and Z by a height of the airfoil in inches. The X and Y values, when connected by smooth continuing arcs, define airfoil profile sections at each Z distance. The airfoil profile sections at the Z distances may be joined smoothly with one another to form a complete suction-side airfoil shape. The X, Y and Z distances being scalable as a function of the same constant or number to provide a scaled-up or scaled-down airfoil.

The present application further provides a turbine with a number of turbine nozzles having an airfoil having an airfoil shape. The airfoils having a nominal profile substantially in accordance with Cartesian coordinate values of X, Y and Z set forth in Table I. The Cartesian coordinate values of X, Y and Z are non-dimensional values from 0% to 100% convertible to dimensional distances in inches by multiplying the Cartesian coordinate values of X, Y and Z by a height of the airfoil in inches. The X and Y values, when connected by smooth continuing arcs, define airfoil profile sections at each Z distance. The airfoil profile sections at the Z distances may be joined smoothly with one another to form a complete airfoil shape.

Those of ordinary skill in the art will better appreciate the features and aspects of such embodiments, and others, upon review of the specification.

BRIEF DESCRIPTION OF THE DRAWINGS

A full and enabling disclosure of various embodiments, including the best mode thereof to one skilled in the art, is set forth more particularly in the remainder of the specification, including reference to the accompanying figures, in which.

DETAILED DESCRIPTION

Figure 1:
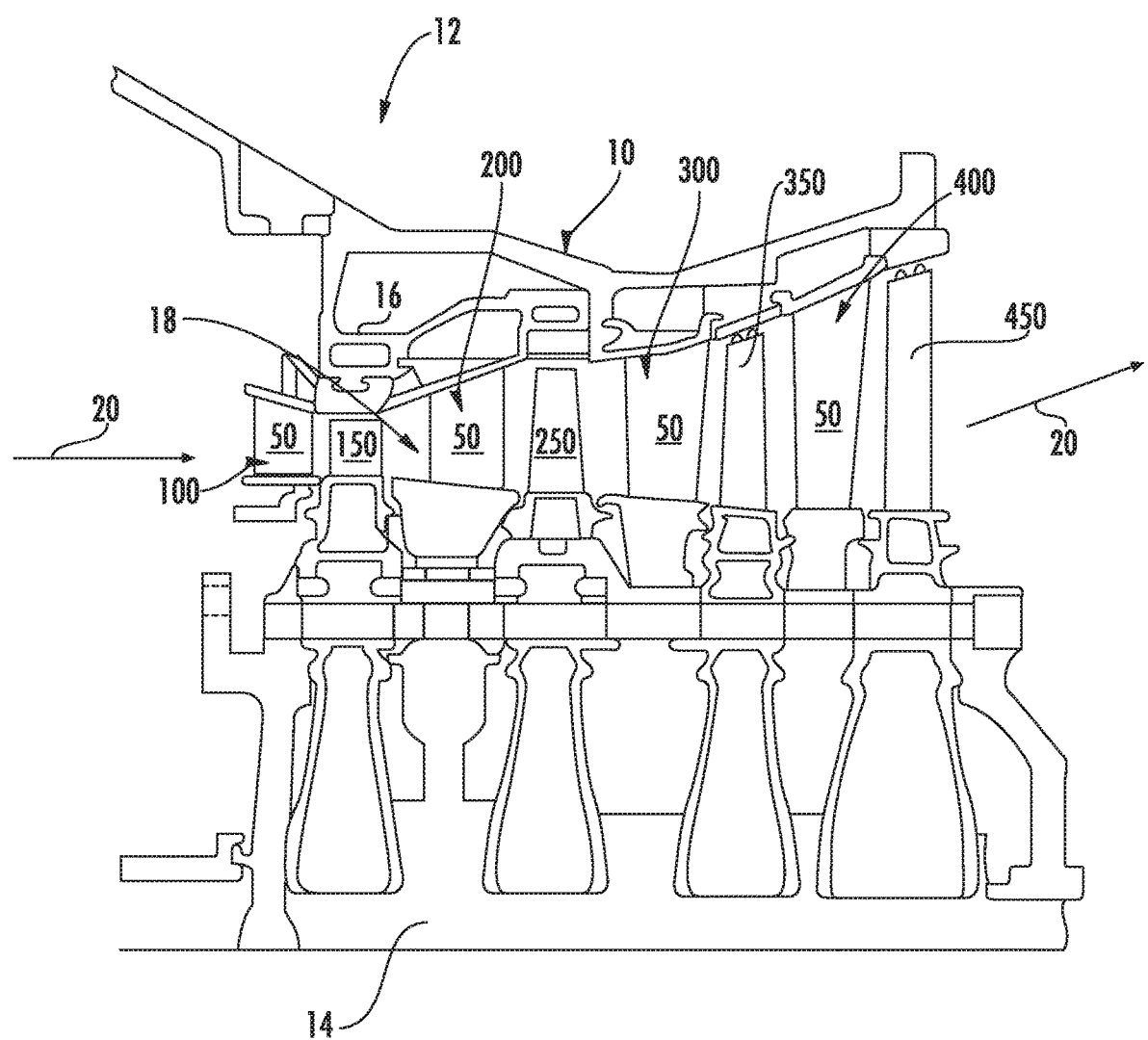
FIG. 1 is a schematic representation of an exemplary turbine having multiple stages with each stage including alternating rows of turbine rotor blades and turbine nozzles according to at least one embodiment of the present disclosure.

Referring now to the drawings, particularly to FIG. 1, there is illustrated an exemplary turbine 10 of a gas turbine 12 including a plurality of turbine stages arranged in serial flow order. Each stage of the turbine includes a row of turbine nozzles or vanes disposed axially adjacent to a corresponding row of turbine rotor blades. Four stages are illustrated in FIG. 1. The exact number of stages of the turbine 10 is a choice of engineering design, and may be more or less than the four stages illustrated in FIG. 1. The four stages are merely exemplary of one turbine design, and are not intended to limit the presently claimed turbine rotor blade in any manner.

The first stage comprises a plurality of turbine nozzles or vanes 100 and a plurality of turbine rotor blades 150. The turbine nozzles 100 are annularly arranged about an axis of a turbine rotor 14. The turbine rotor blades 150 are annularly arranged about and coupled to the turbine rotor 14. A second stage of the turbine 12 includes a plurality of turbine nozzles 200 annularly arranged about the axis of the turbine rotor 14 and a plurality of turbine rotor blades 250 annularly arranged about and coupled to the turbine rotor 14. The turbine nozzles 200 may be coupled to a casing 16 of the turbine 12.

As shown in FIG. 1, a third stage of the turbine 12 includes a plurality of turbine nozzles 300 annularly arranged about the axis of the turbine rotor 14 and a plurality of turbine rotor blades 350 annularly arranged about and coupled to the turbine rotor 14. The turbine nozzles 300 may be coupled to the casing 16 of the turbine 12. In particular embodiments, the turbine 12 includes a fourth stage which includes plurality of turbine nozzles 400 annularly arranged about the axis of the turbine rotor 14 and a plurality of turbine rotor blades 450 annularly arranged about and coupled to the turbine rotor 14. The fourth stage turbine nozzles 400 may be coupled to the casing 16 of the turbine 12.

It will be appreciated that the turbine nozzles 100, 200, 300 and 400 and turbine rotor blades 150, 250, 350 and 450 are disposed or at least partially disposed within a hot gas path 18 of the turbine 12. The various stages of the turbine 10 at least partially define the hot gas path 18 through which combustion gases, as indicated by arrows 20, flow during operation of the gas turbine 12.

Figure 2:
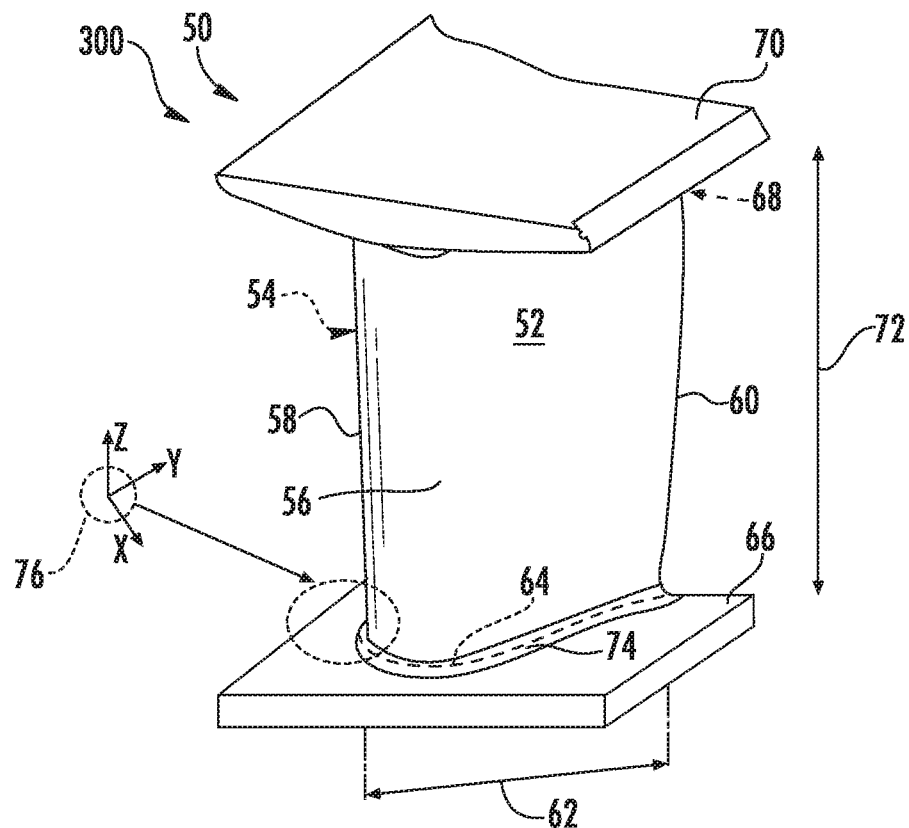
FIG. 2 is a perspective view of an exemplary turbine nozzle according to at least one embodiment of the present disclosure.
Figure 3:
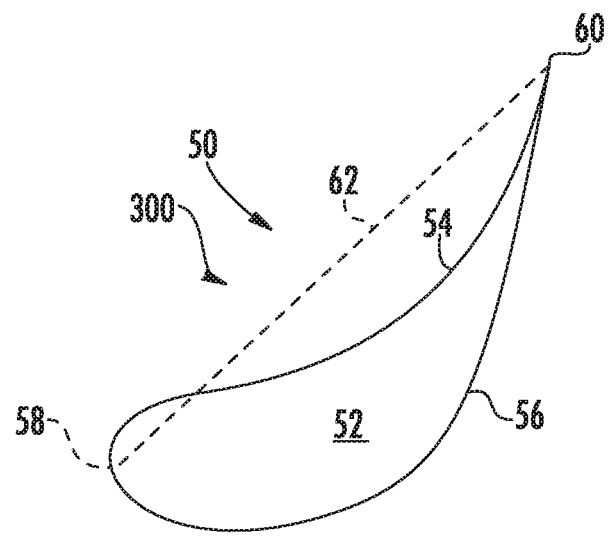
FIG. 3 provides a cross-sectional view of an airfoil portion of the turbine nozzle of FIG. 2.

FIG. 2 provides a perspective view of an exemplary turbine nozzle 50 as may be incorporated in any stage of the turbine 12. FIG. 3 provides a cross-sectional top view of an airfoil 52 of the turbine nozzle 50 shown in FIG. 2. In one embodiment the turbine nozzle 50 as provided in Table I below is representative of turbine nozzle 300 of the plurality of turbine nozzles 300 of the third stage as shown in FIG. 1. As shown in FIGS. 2 and 3 collectively, the turbine nozzle 50 airfoil 52 includes a pressure-side wall 54 and an opposing suction-side wall 56. The pressure-side wall 54 and the suction-side wall 56 meet or intersect at a leading edge 58 and at a trailing edge 60 of the airfoil 52. A chord line 62 extends between the leading edge 58 and the trailing edge 60 such that pressure and suction-side walls 54, 56 can be said to extend in chord or chordwise between the leading edge 58 and the trailing edge 60.

As shown in FIG. 2, the airfoil 52 includes a root or first end 64 which intersects with and extends radially outwardly from an inner band 66 of the turbine nozzle 50. The airfoil 52 terminates radially at a second end or tip 68 of the airfoil 52. The second end 68 intersects with and extends radially inwardly from an outer band 70 of the turbine nozzle 50. The pressure and suction-side walls 54, 56 can be said to extend in height and/or span or in a span-wise direction 72 between the root 64 and/or the inner band 66 and the second end 68 or the outer band 70. In other words, each turbine nozzle 50 includes an airfoil 52 having opposing pressure and suction-side walls 54, 56 that extend in chord or chordwise 62 between opposing leading and trailing edges 58, 60 and that extend in span or span-wise 72 between the root 64 and the second end 68 of the airfoil 52.

In particular configurations, the airfoil 52 may include a fillet 74 formed between the inner band 66 and the airfoil 52 proximate to the root 64. The fillet 74 can include a weld or braze fillet, which can be formed via conventional MIG welding, TIG welding, brazing, etc., and can include a profile that can reduce fluid dynamic losses as a result of the presence of fillet 74. In particular embodiments, the inner band 66, airfoil 52 and the fillet 74 can be formed as a single component, such as by casting and/or machining and/or 3D printing and/or any other suitable technique now known or later developed and/or discovered.

The airfoil 52 of the turbine nozzle 50 has a profile at any cross-section taken between the inner band 66 or the root 64 and the second end 68. The X, Y, and Z values are given in Table I as percentage values of the airfoil length or height/span. As one example only, the height or radial span of the airfoil 52 of turbine nozzle 50 may be from about 5 inches to about 20 inches (about 12 centimeters to about 51 centimeters). However, it is to be understood that heights below or above this range may also be employed as desired in the specific application.

The gas turbine hot gas path 18 requires airfoils 52 that meet system requirements of aerodynamic and mechanical blade loading and efficiency. To define the airfoil shape of each turbine nozzle airfoil 52, there is a unique set or loci of points in space that meet the stage requirements and can be manufactured. These unique loci of points meet the requirements for stage efficiency and are arrived at by iteration between aerodynamic and mechanical loadings enabling the turbine to run in an efficient, safe and smooth manner. These points are unique and specific to the system.

The loci that defines the turbine nozzle airfoil profile includes a set of about 2,200 points with X, Y and Z dimensions relative to a reference origin coordinate system. The Cartesian coordinate system of X, Y and Z values given in Table I below defines the profile of the turbine nozzle airfoil at various locations along its length. Table I lists data for a non-coated airfoil. The envelope/tolerance for the coordinates is about +/−5% in a direction normal to any airfoil surface location and/or about +/−5% of the chord 62 in a direction nominal to any airfoil surface location. The point data origin 76 is defined at or proximate to the leading edge 58 of the airfoil 52 and at or proximate to the root 64.

The coordinate values for the X, Y and Z coordinates are set forth in non-dimensionalized units by the values provided in Table I although other units of dimensions may be used when the values are appropriately converted. The X, Y and Z values set forth in Table I are also expressed in non-dimensional form (X, Y, and Z) from 0% to 100% of the height or span of the airfoil 52. As one example only, the Cartesian coordinate values of X, Y and Z may be convertible to dimensional distances by multiplying the X, Y and Z values by a height of the airfoil at the leading edge 58 and multiplying by a constant number (e.g., 100). As one example only, the Cartesian coordinate values of X, Y and Z may be convertible to dimensional distances by multiplying the X, Y and Z values by a height of the airfoil at the trailing edge 60 and multiplying by a constant number (e.g., 100).

To convert the Z value to a Z coordinate value, e.g., in inches, the non-dimensional Z value given in Table I is multiplied by the Z length of the airfoil in inches. As described above, the Cartesian coordinate system has orthogonally-related X, Y and Z axes and the X axis lies generally parallel to the turbine rotor centerline, i.e., the rotary axis and a positive X coordinate value is axial toward an exhaust end of the turbine 14. The positive Y coordinate value extends tangentially in the direction of rotation of the rotor shaft 14 and the positive Z coordinate value is radially outwardly toward the second end 68 of the airfoil 52. All the values in Table I are given at room temperature and are non-filleted.

By defining X and Y coordinate values at selected locations in a Z direction normal to the X, Y plane, the profile section or airfoil shape of the airfoil 52 of the turbine nozzle 50, at each Z distance along the length of the airfoil 52 can be ascertained. By connecting the X and Y values with smooth continuing arcs, each profile section at each distance Z is fixed. The airfoil profiles of the various surface locations between the distances Z are determined by smoothly connecting the adjacent profile sections to one another to form the airfoil profile.

The Table I values are generated and shown to four decimal places for determining the profile of the airfoil. As the turbine nozzle surface heats up during operation of the turbine 14, mechanical stresses and elevated temperatures will cause a change in the X, Y and Z values. Accordingly, the values for the profile given in Table I represent ambient, non-operating or non-hot conditions (e.g., room temperature) and are for an uncoated airfoil.

There are typical manufacturing tolerances as well as coatings which must be accounted for in the actual profile of the airfoil 52. Each section is joined smoothly with the other sections to form the complete airfoil shape. It will therefore be appreciated that +/− typical manufacturing tolerances, i.e., +/− values, including any coating thicknesses, are additive to the X and Y values given in Table I below. Accordingly, a distance of +/−5% in a direction normal to any surface location along the airfoil profile defines an airfoil profile envelope for this particular turbine nozzle airfoil design and turbine, i.e., a range of variation between measured points on the actual airfoil surface at nominal cold or room temperature and the ideal position of those points as given in the Table below at the same temperature. The data is scalable and the geometry pertains to all aerodynamic scales, at above and/or below 3000 RPM. The design of the airfoil 52 of the turbine nozzle 50 is robust to this range of variation without impairment of mechanical and aerodynamic functions.

TABLE I

| SUCTION-SIDE | | | | PRESSURE-SIDE | | |
|---|---|---|---|---|---|---|
| X (%) | Y (%) | Z (%) | N | X (%) | Y (%) | Z (%) |
| 0.0000 | 0.0000 | 0.0000 | 1 | 0.0000 | 0.0000 | 0.0000 |
| −0.1248 | −0.8295 | 0.0000 | 2 | 0.2295 | 0.6248 | 0.0000 |
| −0.0814 | −1.6674 | 0.0000 | 3 | 0.5705 | 1.1961 | 0.0000 |
| 0.1016 | −2.4868 | 0.0000 | 4 | 1.0062 | 1.7000 | 0.0000 |
| 0.3938 | −3.2736 | 0.0000 | 5 | 1.5147 | 2.1302 | 0.0000 |
| 0.7721 | −4.0240 | 0.0000 | 6 | 2.0767 | 2.4884 | 0.0000 |
| 1.2178 | −4.7357 | 0.0000 | 7 | 2.6752 | 2.7814 | 0.0000 |
| 1.7186 | −5.4101 | 0.0000 | 8 | 3.2992 | 3.0155 | 0.0000 |
| 2.2643 | −6.0496 | 0.0000 | 9 | 3.9403 | 3.1977 | 0.0000 |
| 2.8473 | −6.6543 | 0.0000 | 10 | 4.5922 | 3.3341 | 0.0000 |
| 3.4620 | −7.2271 | 0.0000 | 11 | 5.2519 | 3.4302 | 0.0000 |
| 4.1039 | −7.7682 | 0.0000 | 12 | 5.9163 | 3.4884 | 0.0000 |
| 4.7705 | −8.2806 | 0.0000 | 13 | 6.5822 | 3.5140 | 0.0000 |
| 5.4574 | −8.7636 | 0.0000 | 14 | 7.2488 | 3.5109 | 0.0000 |
| 6.1643 | −9.2186 | 0.0000 | 15 | 7.9147 | 3.4868 | 0.0000 |
| 6.8868 | −9.6465 | 0.0000 | 16 | 8.5814 | 3.4574 | 0.0000 |
| 7.6256 | −10.0473 | 0.0000 | 17 | 9.2473 | 3.4357 | 0.0000 |
| 8.3791 | −10.4194 | 0.0000 | 18 | 9.9140 | 3.4225 | 0.0000 |
| 9.1450 | −10.7636 | 0.0000 | 19 | 10.5806 | 3.4163 | 0.0000 |
| 9.9240 | −11.0783 | 0.0000 | 20 | 11.2473 | 3.4163 | 0.0000 |
| 10.7155 | −11.3620 | 0.0000 | 21 | 11.9140 | 3.4225 | 0.0000 |
| 11.5163 | −11.6147 | 0.0000 | 22 | 12.5806 | 3.4364 | 0.0000 |
| 12.3271 | −11.8349 | 0.0000 | 23 | 13.2465 | 3.4574 | 0.0000 |
| 13.1465 | −12.0225 | 0.0000 | 24 | 13.9124 | 3.4860 | 0.0000 |
| 13.9721 | −12.1775 | 0.0000 | 25 | 14.5783 | 3.5217 | 0.0000 |
| 14.8031 | −12.3000 | 0.0000 | 26 | 15.2434 | 3.5651 | 0.0000 |
| 15.6388 | −12.3884 | 0.0000 | 27 | 15.9085 | 3.6163 | 0.0000 |
| 16.4775 | −12.4442 | 0.0000 | 28 | 16.5721 | 3.6752 | 0.0000 |
| 17.3171 | −12.4667 | 0.0000 | 29 | 17.2357 | 3.7419 | 0.0000 |
| 18.1574 | −12.4566 | 0.0000 | 30 | 17.8984 | 3.8163 | 0.0000 |
| 18.9961 | −12.4140 | 0.0000 | 31 | 18.5597 | 3.8992 | 0.0000 |
| 19.8333 | −12.3395 | 0.0000 | 32 | 19.2202 | 3.9907 | 0.0000 |
| 20.6667 | −12.2341 | 0.0000 | 33 | 19.8791 | 4.0899 | 0.0000 |
| 21.4961 | −12.0984 | 0.0000 | 34 | 20.5372 | 4.1977 | 0.0000 |
| 22.3194 | −11.9326 | 0.0000 | 35 | 21.1938 | 4.3140 | 0.0000 |
| 23.1372 | −11.7380 | 0.0000 | 36 | 21.8481 | 4.4388 | 0.0000 |
| 23.9473 | −11.5155 | 0.0000 | 37 | 22.5016 | 4.5721 | 0.0000 |
| 24.7496 | −11.2667 | 0.0000 | 38 | 23.1527 | 4.7147 | 0.0000 |
| 25.5434 | −10.9907 | 0.0000 | 39 | 23.8023 | 4.8659 | 0.0000 |
| 26.3279 | −10.6899 | 0.0000 | 40 | 24.4496 | 5.0256 | 0.0000 |
| 27.1031 | −10.3659 | 0.0000 | 41 | 25.0938 | 5.1946 | 0.0000 |
| 27.8682 | −10.0178 | 0.0000 | 42 | 25.7364 | 5.3729 | 0.0000 |
| 28.6225 | −9.6481 | 0.0000 | 43 | 26.3760 | 5.5605 | 0.0000 |
| 29.3659 | −9.2566 | 0.0000 | 44 | 27.0132 | 5.7566 | 0.0000 |
| 30.0984 | −8.8450 | 0.0000 | 45 | 27.6473 | 5.9620 | 0.0000 |
| 30.8194 | −8.4140 | 0.0000 | 46 | 28.2783 | 6.1767 | 0.0000 |
| 31.5295 | −7.9643 | 0.0000 | 47 | 28.9062 | 6.4008 | 0.0000 |
| 32.2279 | −7.4969 | 0.0000 | 48 | 29.5310 | 6.6341 | 0.0000 |
| 32.9140 | −7.0124 | 0.0000 | 49 | 30.1519 | 6.8767 | 0.0000 |
| 33.5884 | −6.5109 | 0.0000 | 50 | 30.7690 | 7.1287 | 0.0000 |
| 34.2512 | −5.9946 | 0.0000 | 51 | 31.3829 | 7.3899 | 0.0000 |
| 34.9023 | −5.4636 | 0.0000 | 52 | 31.9922 | 7.6605 | 0.0000 |
| 35.5419 | −4.9186 | 0.0000 | 53 | 32.5969 | 7.9403 | 0.0000 |
| 36.1698 | −4.3597 | 0.0000 | 54 | 33.1977 | 8.2287 | 0.0000 |
| 36.7853 | −3.7884 | 0.0000 | 55 | 33.7946 | 8.5271 | 0.0000 |
| 37.3899 | −3.2047 | 0.0000 | 56 | 34.3860 | 8.8341 | 0.0000 |
| 37.9822 | −2.6093 | 0.0000 | 57 | 34.9729 | 9.1504 | 0.0000 |
| 38.5643 | −2.0023 | 0.0000 | 58 | 35.5543 | 9.4760 | 0.0000 |
| 39.1341 | −1.3853 | 0.0000 | 59 | 36.1318 | 9.8101 | 0.0000 |
| 39.6938 | −0.7581 | 0.0000 | 60 | 36.7031 | 10.1527 | 0.0000 |
| 40.2419 | −0.1217 | 0.0000 | 61 | 37.2698 | 10.5047 | 0.0000 |

TABLE I-continued

| SUCTION-SIDE | | | | PRESSURE-SIDE | | |
|---|---|---|---|---|---|---|
| X (%) | Y (%) | Z (%) | N | X (%) | Y (%) | Z (%) |
| 40.7798 | 0.5240 | 0.0000 | 62 | 37.8310 | 10.8643 | 0.0000 |
| 41.3070 | 1.1783 | 0.0000 | 63 | 38.3860 | 11.2326 | 0.0000 |
| 41.8240 | 1.8403 | 0.0000 | 64 | 38.9364 | 11.6093 | 0.0000 |
| 42.3310 | 2.5101 | 0.0000 | 65 | 39.4806 | 11.9946 | 0.0000 |
| 42.8287 | 3.1876 | 0.0000 | 66 | 40.0194 | 12.3876 | 0.0000 |
| 43.3178 | 3.8713 | 0.0000 | 67 | 40.5519 | 12.7884 | 0.0000 |
| 43.7969 | 4.5605 | 0.0000 | 68 | 41.0783 | 13.1969 | 0.0000 |
| 44.2682 | 5.2566 | 0.0000 | 69 | 41.5992 | 13.6132 | 0.0000 |
| 44.7318 | 5.9574 | 0.0000 | 70 | 42.1140 | 14.0372 | 0.0000 |
| 45.1868 | 6.6636 | 0.0000 | 71 | 42.6225 | 14.4682 | 0.0000 |
| 45.6349 | 7.3744 | 0.0000 | 72 | 43.1248 | 14.9062 | 0.0000 |
| 46.0752 | 8.0899 | 0.0000 | 73 | 43.6209 | 15.3519 | 0.0000 |
| 46.5093 | 8.8101 | 0.0000 | 74 | 44.1109 | 15.8039 | 0.0000 |
| 46.9357 | 9.5333 | 0.0000 | 75 | 44.5946 | 16.2620 | 0.0000 |
| 47.3558 | 10.2612 | 0.0000 | 76 | 45.0721 | 16.7271 | 0.0000 |
| 47.7698 | 10.9922 | 0.0000 | 77 | 45.5442 | 17.1984 | 0.0000 |
| 48.1775 | 11.7271 | 0.0000 | 78 | 46.0093 | 17.6760 | 0.0000 |
| 48.5798 | 12.4651 | 0.0000 | 79 | 46.4682 | 18.1597 | 0.0000 |
| 48.9767 | 13.2054 | 0.0000 | 80 | 46.9209 | 18.6488 | 0.0000 |
| 49.3682 | 13.9488 | 0.0000 | 81 | 47.3674 | 19.1442 | 0.0000 |
| 49.7543 | 14.6953 | 0.0000 | 82 | 47.8078 | 19.6442 | 0.0000 |
| 50.1364 | 15.4434 | 0.0000 | 83 | 48.2419 | 20.1504 | 0.0000 |
| 50.5132 | 16.1946 | 0.0000 | 84 | 48.6705 | 20.6605 | 0.0000 |
| 50.8860 | 16.9481 | 0.0000 | 85 | 49.0930 | 21.1767 | 0.0000 |
| 51.2543 | 17.7031 | 0.0000 | 86 | 49.5093 | 21.6969 | 0.0000 |
| 51.6186 | 18.4605 | 0.0000 | 87 | 49.9194 | 22.2225 | 0.0000 |
| 51.9791 | 19.2194 | 0.0000 | 88 | 50.3233 | 22.7535 | 0.0000 |
| 52.3349 | 19.9806 | 0.0000 | 89 | 50.7209 | 23.2884 | 0.0000 |
| 52.6876 | 20.7434 | 0.0000 | 90 | 51.1124 | 23.8279 | 0.0000 |
| 53.0364 | 21.5078 | 0.0000 | 91 | 51.4977 | 24.3721 | 0.0000 |
| 53.3822 | 22.2736 | 0.0000 | 92 | 51.8775 | 24.9194 | 0.0000 |
| 53.7248 | 23.0403 | 0.0000 | 93 | 52.2527 | 25.4713 | 0.0000 |
| 54.0643 | 23.8093 | 0.0000 | 94 | 52.6217 | 26.0256 | 0.0000 |
| 54.4008 | 24.5791 | 0.0000 | 95 | 52.9868 | 26.5837 | 0.0000 |
| 54.7349 | 25.3496 | 0.0000 | 96 | 53.3450 | 27.1465 | 0.0000 |
| 55.0659 | 26.1225 | 0.0000 | 97 | 53.6969 | 27.7124 | 0.0000 |
| 55.3946 | 26.8961 | 0.0000 | 98 | 54.0550 | 28.2736 | 0.0000 |
| 55.6341 | 27.6930 | 0.0000 | 99 | 54.6295 | 28.5806 | 0.0000 |
| 55.2581 | 28.4124 | 0.0000 | 100 | 55.2581 | 28.4124 | 0.0000 |
| −0.6806 | −0.5589 | 10.0000 | 1 | −0.6806 | −0.5589 | 10.0000 |
| −0.8512 | −1.4039 | 10.0000 | 2 | −0.4109 | 0.0628 | 10.0000 |
| −0.8388 | −2.2651 | 10.0000 | 3 | −0.0318 | 0.6240 | 10.0000 |
| −0.6729 | −3.1116 | 10.0000 | 4 | 0.4372 | 1.1132 | 10.0000 |
| −0.3860 | −3.9256 | 10.0000 | 5 | 0.9729 | 1.5279 | 10.0000 |
| −0.0070 | −4.7008 | 10.0000 | 6 | 1.5566 | 1.8729 | 10.0000 |
| 0.4457 | −5.4357 | 10.0000 | 7 | 2.1744 | 2.1535 | 10.0000 |
| 0.9558 | −6.1326 | 10.0000 | 8 | 2.8140 | 2.3783 | 10.0000 |
| 1.5132 | −6.7915 | 10.0000 | 9 | 3.4698 | 2.5527 | 10.0000 |
| 2.1101 | −7.4147 | 10.0000 | 10 | 4.1349 | 2.6822 | 10.0000 |
| 2.7403 | −8.0054 | 10.0000 | 11 | 4.8078 | 2.7729 | 10.0000 |
| 3.3984 | −8.5643 | 10.0000 | 12 | 5.4837 | 2.8271 | 10.0000 |
| 4.0806 | −9.0930 | 10.0000 | 13 | 6.1612 | 2.8496 | 10.0000 |
| 4.7853 | −9.5922 | 10.0000 | 14 | 6.8395 | 2.8419 | 10.0000 |
| 5.5085 | −10.0628 | 10.0000 | 15 | 7.5178 | 2.8124 | 10.0000 |
| 6.2496 | −10.5062 | 10.0000 | 16 | 8.1953 | 2.7806 | 10.0000 |
| 7.0054 | −10.9233 | 10.0000 | 17 | 8.8736 | 2.7574 | 10.0000 |
| 7.7767 | −11.3116 | 10.0000 | 18 | 9.5512 | 2.7426 | 10.0000 |
| 8.5620 | −11.6713 | 10.0000 | 19 | 10.2302 | 2.7341 | 10.0000 |
| 9.3597 | −12.0008 | 10.0000 | 20 | 10.9085 | 2.7326 | 10.0000 |
| 10.1698 | −12.3000 | 10.0000 | 21 | 11.5868 | 2.7380 | 10.0000 |
| 10.9907 | −12.5667 | 10.0000 | 22 | 12.2651 | 2.7519 | 10.0000 |
| 11.8217 | −12.8008 | 10.0000 | 23 | 12.9426 | 2.7729 | 10.0000 |
| 12.6612 | −13.0016 | 10.0000 | 24 | 13.6209 | 2.8016 | 10.0000 |
| 13.5085 | −13.1682 | 10.0000 | 25 | 14.2984 | 2.8388 | 10.0000 |
| 14.3620 | −13.3000 | 10.0000 | 26 | 14.9752 | 2.8837 | 10.0000 |
| 15.2194 | −13.3969 | 10.0000 | 27 | 15.6512 | 2.9364 | 10.0000 |
| 16.0806 | −13.4589 | 10.0000 | 28 | 16.3271 | 2.9977 | 10.0000 |
| 16.9434 | −13.4860 | 10.0000 | 29 | 17.0016 | 3.0674 | 10.0000 |
| 17.8070 | −13.4783 | 10.0000 | 30 | 17.6760 | 3.1457 | 10.0000 |
| 18.6690 | −13.4357 | 10.0000 | 31 | 18.3481 | 3.2333 | 10.0000 |
| 19.5295 | −13.3597 | 10.0000 | 32 | 19.0202 | 3.3295 | 10.0000 |
| 20.3860 | −13.2496 | 10.0000 | 33 | 19.6899 | 3.4341 | 10.0000 |
| 21.2372 | −13.1078 | 10.0000 | 34 | 20.3589 | 3.5481 | 10.0000 |
| 22.0829 | −12.9333 | 10.0000 | 35 | 21.0264 | 3.6713 | 10.0000 |
| 22.9217 | −12.7287 | 10.0000 | 36 | 21.6915 | 3.8039 | 10.0000 |
| 23.7519 | −12.4938 | 10.0000 | 37 | 22.3550 | 3.9457 | 10.0000 |

TABLE I-continued

| SUCTION-SIDE | | | | PRESSURE-SIDE | | |
|---|---|---|---|---|---|---|
| X (%) | Y (%) | Z (%) | N | X (%) | Y (%) | Z (%) |
| 24.5744 | −12.2295 | 10.0000 | 38 | 23.0163 | 4.0969 | 10.0000 |
| 25.3868 | −11.9380 | 10.0000 | 39 | 23.6752 | 4.2581 | 10.0000 |
| 26.1899 | −11.6202 | 10.0000 | 40 | 24.3318 | 4.4279 | 10.0000 |
| 26.9814 | −11.2760 | 10.0000 | 41 | 24.9860 | 4.6085 | 10.0000 |
| 27.7628 | −10.9078 | 10.0000 | 42 | 25.6372 | 4.7977 | 10.0000 |
| 28.5318 | −10.5155 | 10.0000 | 43 | 26.2853 | 4.9977 | 10.0000 |
| 29.2891 | −10.1016 | 10.0000 | 44 | 26.9310 | 5.2070 | 10.0000 |
| 30.0349 | −9.6659 | 10.0000 | 45 | 27.5729 | 5.4264 | 10.0000 |
| 30.7682 | −9.2109 | 10.0000 | 46 | 28.2109 | 5.6558 | 10.0000 |
| 31.4891 | −8.7357 | 10.0000 | 47 | 28.8457 | 5.8946 | 10.0000 |
| 32.1977 | −8.2419 | 10.0000 | 48 | 29.4775 | 6.1434 | 10.0000 |
| 32.8930 | −7.7302 | 10.0000 | 49 | 30.1047 | 6.4023 | 10.0000 |
| 33.5767 | −7.2023 | 10.0000 | 50 | 30.7271 | 6.6705 | 10.0000 |
| 34.2473 | −6.6589 | 10.0000 | 51 | 31.3457 | 6.9488 | 10.0000 |
| 34.9054 | −6.1000 | 10.0000 | 52 | 31.9605 | 7.2372 | 10.0000 |
| 35.5512 | −5.5264 | 10.0000 | 53 | 32.5698 | 7.5341 | 10.0000 |
| 36.1845 | −4.9395 | 10.0000 | 54 | 33.1744 | 7.8419 | 10.0000 |
| 36.8054 | −4.3403 | 10.0000 | 55 | 33.7744 | 8.1581 | 10.0000 |
| 37.4140 | −3.7279 | 10.0000 | 56 | 34.3698 | 8.4845 | 10.0000 |
| 38.0109 | −3.1047 | 10.0000 | 57 | 34.9589 | 8.8202 | 10.0000 |
| 38.5961 | −2.4698 | 10.0000 | 58 | 35.5434 | 9.1651 | 10.0000 |
| 39.1698 | −1.8240 | 10.0000 | 59 | 36.1217 | 9.5194 | 10.0000 |
| 39.7326 | −1.1690 | 10.0000 | 60 | 36.6946 | 9.8822 | 10.0000 |
| 40.2829 | −0.5039 | 10.0000 | 61 | 37.2628 | 10.2543 | 10.0000 |
| 40.8233 | 0.1698 | 10.0000 | 62 | 37.8240 | 10.6341 | 10.0000 |
| 41.3527 | 0.8512 | 10.0000 | 63 | 38.3806 | 11.0233 | 10.0000 |
| 41.8721 | 1.5419 | 10.0000 | 64 | 38.9302 | 11.4202 | 10.0000 |
| 42.3806 | 2.2388 | 10.0000 | 65 | 39.4744 | 11.8248 | 10.0000 |
| 42.8798 | 2.9434 | 10.0000 | 66 | 40.0124 | 12.2380 | 10.0000 |
| 43.3698 | 3.6543 | 10.0000 | 67 | 40.5450 | 12.6589 | 10.0000 |
| 43.8512 | 4.3713 | 10.0000 | 68 | 41.0705 | 13.0868 | 10.0000 |
| 44.3233 | 5.0938 | 10.0000 | 69 | 41.5907 | 13.5233 | 10.0000 |
| 44.7876 | 5.8217 | 10.0000 | 70 | 42.1039 | 13.9667 | 10.0000 |
| 45.2442 | 6.5550 | 10.0000 | 71 | 42.6116 | 14.4171 | 10.0000 |
| 45.6930 | 7.2922 | 10.0000 | 72 | 43.1124 | 14.8744 | 10.0000 |
| 46.1341 | 8.0349 | 10.0000 | 73 | 43.6078 | 15.3380 | 10.0000 |
| 46.5690 | 8.7806 | 10.0000 | 74 | 44.0961 | 15.8085 | 10.0000 |
| 46.9969 | 9.5302 | 10.0000 | 75 | 44.5791 | 16.2853 | 10.0000 |
| 47.4178 | 10.2845 | 10.0000 | 76 | 45.0550 | 16.7682 | 10.0000 |
| 47.8333 | 11.0411 | 10.0000 | 77 | 45.5256 | 17.2574 | 10.0000 |
| 48.2426 | 11.8016 | 10.0000 | 78 | 45.9891 | 17.7519 | 10.0000 |
| 48.6457 | 12.5651 | 10.0000 | 79 | 46.4473 | 18.2527 | 10.0000 |
| 49.0434 | 13.3310 | 10.0000 | 80 | 46.8992 | 18.7589 | 10.0000 |
| 49.4364 | 14.1000 | 10.0000 | 81 | 47.3450 | 19.2705 | 10.0000 |
| 49.8248 | 14.8713 | 10.0000 | 82 | 47.7845 | 19.7868 | 10.0000 |
| 50.2078 | 15.6450 | 10.0000 | 83 | 48.2186 | 20.3085 | 10.0000 |
| 50.5868 | 16.4209 | 10.0000 | 84 | 48.6465 | 20.8341 | 10.0000 |
| 50.9612 | 17.1992 | 10.0000 | 85 | 49.0690 | 21.3651 | 10.0000 |
| 51.3310 | 17.9791 | 10.0000 | 86 | 49.4860 | 21.9008 | 10.0000 |
| 51.6977 | 18.7612 | 10.0000 | 87 | 49.8961 | 22.4403 | 10.0000 |
| 52.0597 | 19.5450 | 10.0000 | 88 | 50.3008 | 22.9853 | 10.0000 |
| 52.4178 | 20.3302 | 10.0000 | 89 | 50.7000 | 23.5341 | 10.0000 |
| 52.7729 | 21.1171 | 10.0000 | 90 | 51.0930 | 24.0868 | 10.0000 |
| 53.1240 | 21.9062 | 10.0000 | 91 | 51.4798 | 24.6442 | 10.0000 |
| 53.4729 | 22.6961 | 10.0000 | 92 | 51.8620 | 25.2047 | 10.0000 |
| 53.8178 | 23.4876 | 10.0000 | 93 | 52.2388 | 25.7690 | 10.0000 |
| 54.1605 | 24.2798 | 10.0000 | 94 | 52.6109 | 26.3357 | 10.0000 |
| 54.5000 | 25.0736 | 10.0000 | 95 | 52.9783 | 26.9062 | 10.0000 |
| 54.8372 | 25.8690 | 10.0000 | 96 | 53.3403 | 27.4798 | 10.0000 |
| 55.1713 | 26.6651 | 10.0000 | 97 | 53.6961 | 28.0581 | 10.0000 |
| 55.5023 | 27.4620 | 10.0000 | 98 | 54.0465 | 28.6380 | 10.0000 |
| 55.7116 | 28.2868 | 10.0000 | 99 | 54.5775 | 29.0357 | 10.0000 |
| 55.2364 | 28.9690 | 10.0000 | 100 | 55.2364 | 28.9690 | 10.0000 |
| −1.3884 | −1.2457 | 20.0000 | 1 | −1.3884 | −1.2457 | 20.0000 |
| −1.5535 | −2.1147 | 20.0000 | 2 | −1.1147 | −0.6054 | 20.0000 |
| −1.5287 | −3.0000 | 20.0000 | 3 | −0.7233 | −0.0287 | 20.0000 |
| −1.3457 | −3.8674 | 20.0000 | 4 | −0.2364 | 0.4713 | 20.0000 |
| −1.0419 | −4.7000 | 20.0000 | 5 | 0.3202 | 0.8907 | 20.0000 |
| −0.6442 | −5.4922 | 20.0000 | 6 | 0.9264 | 1.2357 | 20.0000 |
| −0.1736 | −6.2434 | 20.0000 | 7 | 1.5667 | 1.5140 | 20.0000 |
| 0.3550 | −6.9550 | 20.0000 | 8 | 2.2295 | 1.7318 | 20.0000 |
| 0.9310 | −7.6295 | 20.0000 | 9 | 2.9070 | 1.8984 | 20.0000 |
| 1.5465 | −8.2674 | 20.0000 | 10 | 3.5946 | 2.0178 | 20.0000 |
| 2.1953 | −8.8721 | 20.0000 | 11 | 4.2884 | 2.0969 | 20.0000 |
| 2.8729 | −9.4450 | 20.0000 | 12 | 4.9845 | 2.1388 | 20.0000 |
| 3.5744 | −9.9868 | 20.0000 | 13 | 5.6822 | 2.1481 | 20.0000 |
| 4.2984 | −10.4992 | 20.0000 | 14 | 6.3798 | 2.1264 | 20.0000 |
| 5.0419 | −10.9829 | 20.0000 | 15 | 7.0767 | 2.0845 | 20.0000 |
| 5.8031 | −11.4380 | 20.0000 | 16 | 7.7736 | 2.0388 | 20.0000 |
| 6.5798 | −11.8659 | 20.0000 | 17 | 8.4705 | 2.0023 | 20.0000 |
| 7.3721 | −12.2651 | 20.0000 | 18 | 9.1682 | 1.9775 | 20.0000 |
| 8.1783 | −12.6341 | 20.0000 | 19 | 9.8659 | 1.9597 | 20.0000 |
| 8.9977 | −12.9729 | 20.0000 | 20 | 10.5636 | 1.9496 | 20.0000 |
| 9.8302 | −13.2791 | 20.0000 | 21 | 11.2612 | 1.9481 | 20.0000 |
| 10.6736 | −13.5519 | 20.0000 | 22 | 11.9597 | 1.9550 | 20.0000 |
| 11.5279 | −13.7907 | 20.0000 | 23 | 12.6574 | 1.9713 | 20.0000 |
| 12.3915 | −13.9938 | 20.0000 | 24 | 13.3550 | 1.9969 | 20.0000 |
| 13.2620 | −14.1612 | 20.0000 | 25 | 14.0519 | 2.0318 | 20.0000 |
| 14.1395 | −14.2922 | 20.0000 | 26 | 14.7488 | 2.0752 | 20.0000 |
| 15.0209 | −14.3860 | 20.0000 | 27 | 15.4442 | 2.1287 | 20.0000 |
| 15.9062 | −14.4434 | 20.0000 | 28 | 16.1395 | 2.1922 | 20.0000 |
| 16.7930 | −14.4628 | 20.0000 | 29 | 16.8333 | 2.2651 | 20.0000 |
| 17.6798 | −14.4457 | 20.0000 | 30 | 17.5264 | 2.3481 | 20.0000 |
| 18.5643 | −14.3915 | 20.0000 | 31 | 18.2186 | 2.4411 | 20.0000 |
| 19.4473 | −14.3016 | 20.0000 | 32 | 18.9085 | 2.5442 | 20.0000 |
| 20.3248 | −14.1760 | 20.0000 | 33 | 19.5977 | 2.6574 | 20.0000 |
| 21.1969 | −14.0163 | 20.0000 | 34 | 20.2845 | 2.7814 | 20.0000 |
| 22.0628 | −13.8233 | 20.0000 | 35 | 20.9690 | 2.9155 | 20.0000 |
| 22.9202 | −13.5977 | 20.0000 | 36 | 21.6519 | 3.0605 | 20.0000 |
| 23.7690 | −13.3403 | 20.0000 | 37 | 22.3326 | 3.2163 | 20.0000 |
| 24.6085 | −13.0527 | 20.0000 | 38 | 23.0109 | 3.3822 | 20.0000 |
| 25.4372 | −12.7372 | 20.0000 | 39 | 23.6860 | 3.5589 | 20.0000 |
| 26.2543 | −12.3930 | 20.0000 | 40 | 24.3581 | 3.7465 | 20.0000 |
| 27.0605 | −12.0225 | 20.0000 | 41 | 25.0271 | 3.9442 | 20.0000 |
| 27.8543 | −11.6271 | 20.0000 | 42 | 25.6930 | 4.1535 | 20.0000 |
| 28.6357 | −11.2078 | 20.0000 | 43 | 26.3558 | 4.3736 | 20.0000 |
| 29.4047 | −10.7659 | 20.0000 | 44 | 27.0140 | 4.6047 | 20.0000 |
| 30.1605 | −10.3016 | 20.0000 | 45 | 27.6690 | 4.8457 | 20.0000 |
| 30.9031 | −9.8178 | 20.0000 | 46 | 28.3202 | 5.0977 | 20.0000 |
| 31.6326 | −9.3132 | 20.0000 | 47 | 28.9667 | 5.3605 | 20.0000 |
| 32.3496 | −8.7907 | 20.0000 | 48 | 29.6085 | 5.6341 | 20.0000 |
| 33.0527 | −8.2512 | 20.0000 | 49 | 30.2465 | 5.9186 | 20.0000 |
| 33.7434 | −7.6946 | 20.0000 | 50 | 30.8791 | 6.2124 | 20.0000 |
| 34.4209 | −7.1217 | 20.0000 | 51 | 31.5070 | 6.5178 | 20.0000 |
| 35.0853 | −6.5349 | 20.0000 | 52 | 32.1302 | 6.8326 | 20.0000 |
| 35.7372 | −5.9333 | 20.0000 | 53 | 32.7481 | 7.1574 | 20.0000 |
| 36.3767 | −5.3186 | 20.0000 | 54 | 33.3605 | 7.4922 | 20.0000 |
| 37.0031 | −4.6907 | 20.0000 | 55 | 33.9667 | 7.8372 | 20.0000 |
| 37.6178 | −4.0512 | 20.0000 | 56 | 34.5682 | 8.1915 | 20.0000 |
| 38.2194 | −3.4000 | 20.0000 | 57 | 35.1636 | 8.5558 | 20.0000 |
| 38.8101 | −2.7380 | 20.0000 | 58 | 35.7535 | 8.9295 | 20.0000 |
| 39.3884 | −2.0659 | 20.0000 | 59 | 36.3372 | 9.3116 | 20.0000 |
| 39.9550 | −1.3837 | 20.0000 | 60 | 36.9147 | 9.7039 | 20.0000 |
| 40.5109 | −0.6922 | 20.0000 | 61 | 37.4868 | 10.1039 | 20.0000 |
| 41.0550 | 0.0078 | 20.0000 | 62 | 38.0519 | 10.5132 | 20.0000 |
| 41.5884 | 0.7163 | 20.0000 | 63 | 38.6116 | 10.9302 | 20.0000 |
| 42.1116 | 1.4326 | 20.0000 | 64 | 39.1651 | 11.3558 | 20.0000 |
| 42.6256 | 2.1558 | 20.0000 | 65 | 39.7124 | 11.7891 | 20.0000 |
| 43.1287 | 2.8860 | 20.0000 | 66 | 40.2527 | 12.2302 | 20.0000 |
| 43.6225 | 3.6225 | 20.0000 | 67 | 40.7876 | 12.6791 | 20.0000 |
| 44.1078 | 4.3651 | 20.0000 | 68 | 41.3163 | 13.1349 | 20.0000 |
| 44.5837 | 5.1132 | 20.0000 | 69 | 41.8380 | 13.5984 | 20.0000 |
| 45.0519 | 5.8667 | 20.0000 | 70 | 42.3535 | 14.0690 | 20.0000 |
| 45.5124 | 6.6248 | 20.0000 | 71 | 42.8628 | 14.5457 | 20.0000 |
| 45.9643 | 7.3876 | 20.0000 | 72 | 43.3659 | 15.0295 | 20.0000 |
| 46.4101 | 8.1543 | 20.0000 | 73 | 43.8628 | 15.5202 | 20.0000 |
| 46.8481 | 8.9256 | 20.0000 | 74 | 44.3535 | 16.0163 | 20.0000 |
| 47.2791 | 9.7008 | 20.0000 | 75 | 44.8388 | 16.5186 | 20.0000 |
| 47.7039 | 10.4791 | 20.0000 | 76 | 45.3171 | 17.0264 | 20.0000 |
| 48.1225 | 11.2612 | 20.0000 | 77 | 45.7891 | 17.5403 | 20.0000 |
| 48.5349 | 12.0465 | 20.0000 | 78 | 46.2558 | 18.0597 | 20.0000 |
| 48.9419 | 12.8349 | 20.0000 | 79 | 46.7163 | 18.5845 | 20.0000 |
| 49.3426 | 13.6256 | 20.0000 | 80 | 47.1705 | 19.1147 | 20.0000 |
| 49.7388 | 14.4194 | 20.0000 | 81 | 47.6186 | 19.6488 | 20.0000 |
| 50.1302 | 15.2155 | 20.0000 | 82 | 48.0612 | 20.1891 | 20.0000 |
| 50.5163 | 16.0132 | 20.0000 | 83 | 48.4984 | 20.7333 | 20.0000 |
| 50.8977 | 16.8140 | 20.0000 | 84 | 48.9302 | 21.2814 | 20.0000 |
| 51.2752 | 17.6171 | 20.0000 | 85 | 49.3558 | 21.8349 | 20.0000 |
| 51.6481 | 18.4217 | 20.0000 | 86 | 49.7760 | 22.3922 | 20.0000 |
| 52.0171 | 19.2279 | 20.0000 | 87 | 50.1907 | 22.9535 | 20.0000 |
| 52.3822 | 20.0364 | 20.0000 | 88 | 50.5992 | 23.5194 | 20.0000 |
| 52.7434 | 20.8465 | 20.0000 | 89 | 51.0023 | 24.0891 | 20.0000 |

TABLE I-continued

| SUCTION-SIDE | | | N | PRESSURE-SIDE | | | | SUCTION-SIDE | | | N | PRESSURE-SIDE | | |
|---|---|---|---|---|---|---|---|---|---|---|---|---|---|---|
| X (%) | Y (%) | Z (%) | | X (%) | Y (%) | Z (%) | | X (%) | Y (%) | Z (%) | | X (%) | Y (%) | Z (%) |
| 53.1008 | 21.6581 | 20.0000 | 90 | 51.4000 | 24.6628 | 20.0000 | | 43.3093 | 2.7016 | 30.0000 | 66 | 40.4891 | 12.2899 | 30.0000 |
| 53.4550 | 22.4713 | 20.0000 | 91 | 51.7930 | 25.2403 | 20.0000 | | 43.8085 | 3.4636 | 30.0000 | 67 | 41.0256 | 12.7612 | 30.0000 |
| 53.8062 | 23.2853 | 20.0000 | 92 | 52.1798 | 25.8209 | 20.0000 | | 44.2992 | 4.2318 | 30.0000 | 68 | 41.5558 | 13.2388 | 30.0000 |
| 54.1535 | 24.1016 | 20.0000 | 93 | 52.5620 | 26.4047 | 20.0000 | | 44.7806 | 5.0054 | 30.0000 | 69 | 42.0791 | 13.7233 | 30.0000 |
| 54.4984 | 24.9186 | 20.0000 | 94 | 52.9403 | 26.9915 | 20.0000 | | 45.2535 | 5.7837 | 30.0000 | 70 | 42.5969 | 14.2155 | 30.0000 |
| 54.8403 | 25.7364 | 20.0000 | 95 | 53.3132 | 27.5814 | 20.0000 | | 45.7186 | 6.5674 | 30.0000 | 71 | 43.1078 | 14.7132 | 30.0000 |
| 55.1798 | 26.5566 | 20.0000 | 96 | 53.6814 | 28.1744 | 20.0000 | | 46.1752 | 7.3558 | 30.0000 | 72 | 43.6124 | 15.2178 | 30.0000 |
| 55.5163 | 27.3767 | 20.0000 | 97 | 54.0434 | 28.7705 | 20.0000 | | 46.6248 | 8.1488 | 30.0000 | 73 | 44.1109 | 15.7287 | 30.0000 |
| 55.8496 | 28.1984 | 20.0000 | 98 | 54.4008 | 29.3705 | 20.0000 | | 47.0667 | 8.9457 | 30.0000 | 74 | 44.6031 | 16.2457 | 30.0000 |
| 56.0814 | 29.0442 | 20.0000 | 99 | 54.9264 | 29.8039 | 20.0000 | | 47.5016 | 9.7457 | 30.0000 | 75 | 45.0891 | 16.7682 | 30.0000 |
| 55.6047 | 29.7481 | 20.0000 | 100 | 55.6047 | 29.7481 | 20.0000 | | 47.9302 | 10.5504 | 30.0000 | 76 | 45.5690 | 17.2961 | 30.0000 |
| −2.0310 | −1.6946 | 30.0000 | 1 | −2.0310 | −1.6946 | 30.0000 | | 48.3527 | 11.3574 | 30.0000 | 77 | 46.0426 | 17.8295 | 30.0000 |
| −2.2512 | −2.5760 | 30.0000 | 2 | −1.7078 | −1.0589 | 30.0000 | | 48.7690 | 12.1682 | 30.0000 | 78 | 46.5109 | 18.3682 | 30.0000 |
| −2.2651 | −3.4853 | 30.0000 | 3 | −1.2698 | −0.4969 | 30.0000 | | 49.1791 | 12.9822 | 30.0000 | 79 | 46.9721 | 18.9124 | 30.0000 |
| −2.1070 | −4.3814 | 30.0000 | 4 | −0.7419 | −0.0178 | 30.0000 | | 49.5837 | 13.7984 | 30.0000 | 80 | 47.4287 | 19.4612 | 30.0000 |
| −1.8147 | −5.2442 | 30.0000 | 5 | −0.1504 | 0.3791 | 30.0000 | | 49.9829 | 14.6171 | 30.0000 | 81 | 47.8791 | 20.0147 | 30.0000 |
| −1.4202 | −6.0651 | 30.0000 | 6 | 0.4860 | 0.7016 | 30.0000 | | 50.3767 | 15.4388 | 30.0000 | 82 | 48.3233 | 20.5729 | 30.0000 |
| −0.9473 | −6.8434 | 30.0000 | 7 | 1.1519 | 0.9574 | 30.0000 | | 50.7659 | 16.2628 | 30.0000 | 83 | 48.7620 | 21.1357 | 30.0000 |
| −0.4116 | −7.5798 | 30.0000 | 8 | 1.8380 | 1.1543 | 30.0000 | | 51.1504 | 17.0884 | 30.0000 | 84 | 49.1953 | 21.7023 | 30.0000 |
| 0.1752 | −8.2775 | 30.0000 | 9 | 2.5364 | 1.3000 | 30.0000 | | 51.5310 | 17.9171 | 30.0000 | 85 | 49.6233 | 22.2736 | 30.0000 |
| 0.8023 | −8.9380 | 30.0000 | 10 | 3.2426 | 1.4016 | 30.0000 | | 51.9070 | 18.7465 | 30.0000 | 86 | 50.0457 | 22.8488 | 30.0000 |
| 1.4651 | −9.5628 | 30.0000 | 11 | 3.9535 | 1.4628 | 30.0000 | | 52.2783 | 19.5783 | 30.0000 | 87 | 50.4628 | 23.4279 | 30.0000 |
| 2.1581 | −10.1543 | 30.0000 | 12 | 4.6667 | 1.4876 | 30.0000 | | 52.6465 | 20.4124 | 30.0000 | 88 | 50.8744 | 24.0109 | 30.0000 |
| 2.8767 | −10.7147 | 30.0000 | 13 | 5.3798 | 1.4798 | 30.0000 | | 53.0101 | 21.2481 | 30.0000 | 89 | 51.2806 | 24.5977 | 30.0000 |
| 3.6186 | −11.2434 | 30.0000 | 14 | 6.0930 | 1.4442 | 30.0000 | | 53.3705 | 22.0845 | 30.0000 | 90 | 51.6806 | 25.1884 | 30.0000 |
| 4.3806 | −11.7434 | 30.0000 | 15 | 6.8047 | 1.3930 | 30.0000 | | 53.7271 | 22.9233 | 30.0000 | 91 | 52.0767 | 25.7822 | 30.0000 |
| 5.1605 | −12.2140 | 30.0000 | 16 | 7.5163 | 1.3434 | 30.0000 | | 54.0806 | 23.7628 | 30.0000 | 92 | 52.4667 | 26.3798 | 30.0000 |
| 5.9574 | −12.6558 | 30.0000 | 17 | 8.2287 | 1.3062 | 30.0000 | | 54.4310 | 24.6039 | 30.0000 | 93 | 52.8527 | 26.9798 | 30.0000 |
| 6.7698 | −13.0682 | 30.0000 | 18 | 8.9419 | 1.2798 | 30.0000 | | 54.7783 | 25.4465 | 30.0000 | 94 | 53.2333 | 27.5829 | 30.0000 |
| 7.5969 | −13.4512 | 30.0000 | 19 | 9.6558 | 1.2612 | 30.0000 | | 55.1225 | 26.2899 | 30.0000 | 95 | 53.6101 | 28.1891 | 30.0000 |
| 8.4372 | −13.8023 | 30.0000 | 20 | 10.3690 | 1.2519 | 30.0000 | | 55.4636 | 27.1349 | 30.0000 | 96 | 53.9822 | 28.7984 | 30.0000 |
| 9.2915 | −14.1202 | 30.0000 | 21 | 11.0829 | 1.2519 | 30.0000 | | 55.8023 | 27.9806 | 30.0000 | 97 | 54.3481 | 29.4109 | 30.0000 |
| 10.1574 | −14.4039 | 30.0000 | 22 | 11.7961 | 1.2612 | 30.0000 | | 56.1388 | 28.8279 | 30.0000 | 98 | 54.7093 | 30.0264 | 30.0000 |
| 11.0333 | −14.6527 | 30.0000 | 23 | 12.5093 | 1.2814 | 30.0000 | | 56.3953 | 29.6938 | 30.0000 | 99 | 55.2341 | 30.4837 | 30.0000 |
| 11.9194 | −14.8643 | 30.0000 | 24 | 13.2225 | 1.3109 | 30.0000 | | 55.9264 | 30.4279 | 30.0000 | 100 | 55.9264 | 30.4279 | 30.0000 |
| 12.8140 | −15.0395 | 30.0000 | 25 | 13.9349 | 1.3504 | 30.0000 | | −2.7031 | −2.2039 | 40.0000 | 1 | −2.7031 | −2.2039 | 40.0000 |
| 13.7147 | −15.1760 | 30.0000 | 26 | 14.6465 | 1.4008 | 30.0000 | | −2.9752 | −3.0953 | 40.0000 | 2 | −2.3380 | −1.5744 | 40.0000 |
| 14.6202 | −15.2744 | 30.0000 | 27 | 15.3581 | 1.4612 | 30.0000 | | −3.0248 | −4.0271 | 40.0000 | 3 | −1.8605 | −1.0233 | 40.0000 |
| 15.5295 | −15.3341 | 30.0000 | 28 | 16.0682 | 1.5318 | 30.0000 | | −2.8860 | −4.9496 | 40.0000 | 4 | −1.2992 | −0.5589 | 40.0000 |
| 16.4403 | −15.3543 | 30.0000 | 29 | 16.7767 | 1.6140 | 30.0000 | | −2.6008 | −5.8388 | 40.0000 | 5 | −0.6783 | −0.1752 | 40.0000 |
| 17.3512 | −15.3364 | 30.0000 | 30 | 17.4845 | 1.7062 | 30.0000 | | −2.2039 | −6.6845 | 40.0000 | 6 | −0.0178 | 0.1333 | 40.0000 |
| 18.2605 | −15.2806 | 30.0000 | 31 | 18.1907 | 1.8093 | 30.0000 | | −1.7217 | −7.4853 | 40.0000 | 7 | 0.6690 | 0.3775 | 40.0000 |
| 19.1674 | −15.1860 | 30.0000 | 32 | 18.8946 | 1.9240 | 30.0000 | | −1.1729 | −8.2411 | 40.0000 | 8 | 1.3744 | 0.5651 | 40.0000 |
| 20.0690 | −15.0550 | 30.0000 | 33 | 19.5969 | 2.0496 | 30.0000 | | −0.5713 | −8.9558 | 40.0000 | 9 | 2.0907 | 0.7031 | 40.0000 |
| 20.9643 | −14.8876 | 30.0000 | 34 | 20.2977 | 2.1860 | 30.0000 | | 0.0744 | −9.6318 | 40.0000 | 10 | 2.8140 | 0.7969 | 40.0000 |
| 21.8527 | −14.6845 | 30.0000 | 35 | 20.9961 | 2.3341 | 30.0000 | | 0.7566 | −10.2705 | 40.0000 | 11 | 3.5411 | 0.8519 | 40.0000 |
| 22.7326 | −14.4481 | 30.0000 | 36 | 21.6915 | 2.4938 | 30.0000 | | 1.4698 | −10.8752 | 40.0000 | 12 | 4.2705 | 0.8705 | 40.0000 |
| 23.6023 | −14.1783 | 30.0000 | 37 | 22.3845 | 2.6643 | 30.0000 | | 2.2093 | −11.4457 | 40.0000 | 13 | 5.0000 | 0.8581 | 40.0000 |
| 24.4628 | −13.8767 | 30.0000 | 38 | 23.0744 | 2.8465 | 30.0000 | | 2.9721 | −11.9853 | 40.0000 | 14 | 5.7287 | 0.8202 | 40.0000 |
| 25.3116 | −13.5457 | 30.0000 | 39 | 23.7612 | 3.0395 | 30.0000 | | 3.7566 | −12.4938 | 40.0000 | 15 | 6.4566 | 0.7705 | 40.0000 |
| 26.1481 | −13.1853 | 30.0000 | 40 | 24.4450 | 3.2442 | 30.0000 | | 4.5589 | −12.9729 | 40.0000 | 16 | 7.1853 | 0.7279 | 40.0000 |
| 26.9729 | −12.7977 | 30.0000 | 41 | 25.1248 | 3.4605 | 30.0000 | | 5.3783 | −13.4225 | 40.0000 | 17 | 7.9140 | 0.6984 | 40.0000 |
| 27.7845 | −12.3837 | 30.0000 | 42 | 25.8008 | 3.6884 | 30.0000 | | 6.2132 | −13.8426 | 40.0000 | 18 | 8.6434 | 0.6783 | 40.0000 |
| 28.5829 | −11.9442 | 30.0000 | 43 | 26.4736 | 3.9271 | 30.0000 | | 7.0628 | −14.2318 | 40.0000 | 19 | 9.3729 | 0.6674 | 40.0000 |
| 29.3674 | −11.4822 | 30.0000 | 44 | 27.1419 | 4.1775 | 30.0000 | | 7.9264 | −14.5891 | 40.0000 | 20 | 10.1023 | 0.6659 | 40.0000 |
| 30.1395 | −10.9969 | 30.0000 | 45 | 27.8054 | 4.4388 | 30.0000 | | 8.8031 | −14.9132 | 40.0000 | 21 | 10.8318 | 0.6736 | 40.0000 |
| 30.8969 | −10.4907 | 30.0000 | 46 | 28.4651 | 4.7116 | 30.0000 | | 9.6922 | −15.2023 | 40.0000 | 22 | 11.5612 | 0.6922 | 40.0000 |
| 31.6411 | −9.9651 | 30.0000 | 47 | 29.1202 | 4.9953 | 30.0000 | | 10.5915 | −15.4550 | 40.0000 | 23 | 12.2907 | 0.7202 | 40.0000 |
| 32.3705 | −9.4194 | 30.0000 | 48 | 29.7698 | 5.2899 | 30.0000 | | 11.5008 | −15.6713 | 40.0000 | 24 | 13.0194 | 0.7597 | 40.0000 |
| 33.0868 | −8.8566 | 30.0000 | 49 | 30.4147 | 5.5953 | 30.0000 | | 12.4186 | −15.8488 | 40.0000 | 25 | 13.7473 | 0.8085 | 40.0000 |
| 33.7899 | −8.2760 | 30.0000 | 50 | 31.0543 | 5.9116 | 30.0000 | | 13.3426 | −15.9876 | 40.0000 | 26 | 14.4744 | 0.8690 | 40.0000 |
| 34.4783 | −7.6798 | 30.0000 | 51 | 31.6884 | 6.2388 | 30.0000 | | 14.2721 | −16.0868 | 40.0000 | 27 | 15.2000 | 0.9395 | 40.0000 |
| 35.1543 | −7.0690 | 30.0000 | 52 | 32.3178 | 6.5760 | 30.0000 | | 15.2047 | −16.1465 | 40.0000 | 28 | 15.9256 | 1.0209 | 40.0000 |
| 35.8171 | −6.4434 | 30.0000 | 53 | 32.9411 | 6.9233 | 30.0000 | | 16.1388 | −16.1667 | 40.0000 | 29 | 16.6488 | 1.1140 | 40.0000 |
| 36.4659 | −5.8039 | 30.0000 | 54 | 33.5581 | 7.2814 | 30.0000 | | 17.0729 | −16.1457 | 40.0000 | 30 | 17.3713 | 1.2178 | 40.0000 |
| 37.1023 | −5.1519 | 30.0000 | 55 | 34.1698 | 7.6488 | 30.0000 | | 18.0054 | −16.0860 | 40.0000 | 31 | 18.0915 | 1.3333 | 40.0000 |
| 37.7256 | −4.4868 | 30.0000 | 56 | 34.7760 | 8.0264 | 30.0000 | | 18.9349 | −15.9868 | 40.0000 | 32 | 18.8101 | 1.4597 | 40.0000 |
| 38.3364 | −3.8109 | 30.0000 | 57 | 35.3752 | 8.4132 | 30.0000 | | 19.8597 | −15.8496 | 40.0000 | 33 | 19.5264 | 1.5984 | 40.0000 |
| 38.9349 | −3.1240 | 30.0000 | 58 | 35.9682 | 8.8093 | 30.0000 | | 20.7775 | −15.6744 | 40.0000 | 34 | 20.2403 | 1.7481 | 40.0000 |
| 39.5217 | −2.4271 | 30.0000 | 59 | 36.5558 | 9.2147 | 30.0000 | | 21.6876 | −15.4628 | 40.0000 | 35 | 20.9519 | 1.9093 | 40.0000 |
| 40.0961 | −1.7194 | 30.0000 | 60 | 37.1364 | 9.6295 | 30.0000 | | 22.5891 | −15.2155 | 40.0000 | 36 | 21.6605 | 2.0829 | 40.0000 |
| 40.6589 | −1.0031 | 30.0000 | 61 | 37.7116 | 10.0527 | 30.0000 | | 23.4806 | −14.9349 | 40.0000 | 37 | 22.3667 | 2.2674 | 40.0000 |
| 41.2101 | −0.2775 | 30.0000 | 62 | 38.2798 | 10.4837 | 30.0000 | | 24.3612 | −14.6209 | 40.0000 | 38 | 23.0690 | 2.4643 | 40.0000 |
| 41.7504 | 0.4558 | 30.0000 | 63 | 38.8419 | 10.9240 | 30.0000 | | 25.2295 | −14.2760 | 40.0000 | 39 | 23.7682 | 2.6721 | 40.0000 |
| 42.2806 | 1.1977 | 30.0000 | 64 | 39.3977 | 11.3713 | 30.0000 | | 26.0853 | −13.9008 | 40.0000 | 40 | 24.4636 | 2.8922 | 40.0000 |
| 42.8000 | 1.9465 | 30.0000 | 65 | 39.9465 | 11.8271 | 30.0000 | | 26.9287 | −13.4977 | 40.0000 | 41 | 25.1558 | 3.1240 | 40.0000 |

TABLE I-continued

| SUCTION-SIDE | | | | PRESSURE-SIDE | | | | SUCTION-SIDE | | | | PRESSURE-SIDE | | |
|---|---|---|---|---|---|---|---|---|---|---|---|---|---|---|
| X (%) | Y (%) | Z (%) | N | X (%) | Y (%) | Z (%) | | X (%) | Y (%) | Z (%) | N | X (%) | Y (%) | Z (%) |
| 27.7581 | −13.0667 | 40.0000 | 42 | 25.8434 | 3.3674 | 40.0000 | | 5.8628 | −14.6682 | 50.0000 | 18 | 8.1194 | 0.1519 | 50.0000 |
| 28.5736 | −12.6109 | 40.0000 | 43 | 26.5271 | 3.6233 | 40.0000 | | 6.7388 | −15.0519 | 50.0000 | 19 | 8.8674 | 0.1512 | 50.0000 |
| 29.3752 | −12.1302 | 40.0000 | 44 | 27.2062 | 3.8899 | 40.0000 | | 7.6287 | −15.4039 | 50.0000 | 20 | 9.6155 | 0.1597 | 50.0000 |
| 30.1620 | −11.6264 | 40.0000 | 45 | 27.8806 | 4.1682 | 40.0000 | | 8.5310 | −15.7217 | 50.0000 | 21 | 10.3628 | 0.1775 | 50.0000 |
| 30.9349 | −11.1008 | 40.0000 | 46 | 28.5504 | 4.4574 | 40.0000 | | 9.4450 | −16.0039 | 50.0000 | 22 | 11.1101 | 0.2062 | 50.0000 |
| 31.6938 | −10.5543 | 40.0000 | 47 | 29.2147 | 4.7589 | 40.0000 | | 10.3690 | −16.2488 | 50.0000 | 23 | 11.8574 | 0.2457 | 50.0000 |
| 32.4372 | −9.9884 | 40.0000 | 48 | 29.8744 | 5.0705 | 40.0000 | | 11.3031 | −16.4574 | 50.0000 | 24 | 12.6039 | 0.2946 | 50.0000 |
| 33.1674 | −9.4047 | 40.0000 | 49 | 30.5287 | 5.3938 | 40.0000 | | 12.2450 | −16.6264 | 50.0000 | 25 | 13.3496 | 0.3543 | 50.0000 |
| 33.8822 | −8.8031 | 40.0000 | 50 | 31.1767 | 5.7279 | 40.0000 | | 13.1922 | −16.7558 | 50.0000 | 26 | 14.0938 | 0.4248 | 50.0000 |
| 34.5837 | −8.1853 | 40.0000 | 51 | 31.8202 | 6.0729 | 40.0000 | | 14.1450 | −16.8457 | 50.0000 | 27 | 14.8380 | 0.5062 | 50.0000 |
| 35.2705 | −7.5512 | 40.0000 | 52 | 32.4574 | 6.4279 | 40.0000 | | 15.1000 | −16.8946 | 50.0000 | 28 | 15.5798 | 0.5984 | 50.0000 |
| 35.9442 | −6.9031 | 40.0000 | 53 | 33.0884 | 6.7938 | 40.0000 | | 16.0566 | −16.9031 | 50.0000 | 29 | 16.3209 | 0.7023 | 50.0000 |
| 36.6039 | −6.2411 | 40.0000 | 54 | 33.7132 | 7.1698 | 40.0000 | | 17.0124 | −16.8705 | 50.0000 | 30 | 17.0597 | 0.8171 | 50.0000 |
| 37.2496 | −5.5659 | 40.0000 | 55 | 34.3326 | 7.5566 | 40.0000 | | 17.9667 | −16.7984 | 50.0000 | 31 | 17.7969 | 0.9434 | 50.0000 |
| 37.8829 | −4.8783 | 40.0000 | 56 | 34.9450 | 7.9519 | 40.0000 | | 18.9163 | −16.6860 | 50.0000 | 32 | 18.5326 | 1.0814 | 50.0000 |
| 38.5031 | −4.1791 | 40.0000 | 57 | 35.5519 | 8.3581 | 40.0000 | | 19.8612 | −16.5341 | 50.0000 | 33 | 19.2651 | 1.2310 | 50.0000 |
| 39.1101 | −3.4690 | 40.0000 | 58 | 36.1519 | 8.7729 | 40.0000 | | 20.7984 | −16.3442 | 50.0000 | 34 | 19.9953 | 1.3922 | 50.0000 |
| 39.7047 | −2.7473 | 40.0000 | 59 | 36.7457 | 9.1969 | 40.0000 | | 21.7279 | −16.1178 | 50.0000 | 35 | 20.7233 | 1.5651 | 50.0000 |
| 40.2876 | −2.0163 | 40.0000 | 60 | 37.3326 | 9.6302 | 40.0000 | | 22.6473 | −15.8550 | 50.0000 | 36 | 21.4481 | 1.7504 | 50.0000 |
| 40.8574 | −1.2760 | 40.0000 | 61 | 37.9132 | 10.0721 | 40.0000 | | 23.5566 | −15.5574 | 50.0000 | 37 | 22.1698 | 1.9465 | 50.0000 |
| 41.4163 | −0.5264 | 40.0000 | 62 | 38.4868 | 10.5225 | 40.0000 | | 24.4543 | −15.2264 | 50.0000 | 38 | 22.8884 | 2.1558 | 50.0000 |
| 41.9636 | 0.2310 | 40.0000 | 63 | 39.0550 | 10.9806 | 40.0000 | | 25.3395 | −14.8636 | 50.0000 | 39 | 23.6031 | 2.3760 | 50.0000 |
| 42.4992 | 0.9969 | 40.0000 | 64 | 39.6155 | 11.4473 | 40.0000 | | 26.2116 | −14.4705 | 50.0000 | 40 | 24.3140 | 2.6085 | 50.0000 |
| 43.0248 | 1.7698 | 40.0000 | 65 | 40.1698 | 11.9217 | 40.0000 | | 27.0698 | −14.0481 | 50.0000 | 41 | 25.0209 | 2.8535 | 50.0000 |
| 43.5395 | 2.5496 | 40.0000 | 66 | 40.7178 | 12.4039 | 40.0000 | | 27.9140 | −13.5984 | 50.0000 | 42 | 25.7233 | 3.1093 | 50.0000 |
| 44.0450 | 3.3357 | 40.0000 | 67 | 41.2589 | 12.8930 | 40.0000 | | 28.7442 | −13.1225 | 50.0000 | 43 | 26.4217 | 3.3775 | 50.0000 |
| 44.5403 | 4.1287 | 40.0000 | 68 | 41.7930 | 13.3899 | 40.0000 | | 29.5589 | −12.6217 | 50.0000 | 44 | 27.1155 | 3.6574 | 50.0000 |
| 45.0264 | 4.9264 | 40.0000 | 69 | 42.3217 | 13.8930 | 40.0000 | | 30.3589 | −12.0977 | 50.0000 | 45 | 27.8039 | 3.9496 | 50.0000 |
| 45.5039 | 5.7302 | 40.0000 | 70 | 42.8426 | 14.4031 | 40.0000 | | 31.1442 | −11.5512 | 50.0000 | 46 | 28.4876 | 4.2527 | 50.0000 |
| 45.9736 | 6.5380 | 40.0000 | 71 | 43.3581 | 14.9202 | 40.0000 | | 31.9147 | −10.9837 | 50.0000 | 47 | 29.1667 | 4.5674 | 50.0000 |
| 46.4341 | 7.3512 | 40.0000 | 72 | 43.8667 | 15.4434 | 40.0000 | | 32.6698 | −10.3969 | 50.0000 | 48 | 29.8395 | 4.8930 | 50.0000 |
| 46.8876 | 8.1690 | 40.0000 | 73 | 44.3690 | 15.9721 | 40.0000 | | 33.4109 | −9.7907 | 50.0000 | 49 | 30.5070 | 5.2310 | 50.0000 |
| 47.3333 | 8.9899 | 40.0000 | 74 | 44.8651 | 16.5070 | 40.0000 | | 34.1364 | −9.1674 | 50.0000 | 50 | 31.1690 | 5.5791 | 50.0000 |
| 47.7721 | 9.8155 | 40.0000 | 75 | 45.3550 | 17.0481 | 40.0000 | | 34.8473 | −8.5279 | 50.0000 | 51 | 31.8248 | 5.9388 | 50.0000 |
| 48.2047 | 10.6442 | 40.0000 | 76 | 45.8388 | 17.5938 | 40.0000 | | 35.5442 | −7.8721 | 50.0000 | 52 | 32.4744 | 6.3093 | 50.0000 |
| 48.6302 | 11.4760 | 40.0000 | 77 | 46.3163 | 18.1457 | 40.0000 | | 36.2264 | −7.2016 | 50.0000 | 53 | 33.1186 | 6.6899 | 50.0000 |
| 49.0488 | 12.3116 | 40.0000 | 78 | 46.7884 | 18.7023 | 40.0000 | | 36.8946 | −6.5171 | 50.0000 | 54 | 33.7566 | 7.0806 | 50.0000 |
| 49.4620 | 13.1496 | 40.0000 | 79 | 47.2535 | 19.2636 | 40.0000 | | 37.5488 | −5.8194 | 50.0000 | 55 | 34.3876 | 7.4822 | 50.0000 |
| 49.8698 | 13.9907 | 40.0000 | 80 | 47.7132 | 19.8302 | 40.0000 | | 38.1899 | −5.1085 | 50.0000 | 56 | 35.0124 | 7.8938 | 50.0000 |
| 50.2721 | 14.8349 | 40.0000 | 81 | 48.1674 | 20.4016 | 40.0000 | | 38.8171 | −4.3868 | 50.0000 | 57 | 35.6302 | 8.3147 | 50.0000 |
| 50.6690 | 15.6806 | 40.0000 | 82 | 48.6155 | 20.9775 | 40.0000 | | 39.4310 | −3.6535 | 50.0000 | 58 | 36.2419 | 8.7450 | 50.0000 |
| 51.0612 | 16.5295 | 40.0000 | 83 | 49.0574 | 21.5581 | 40.0000 | | 40.0326 | −2.9093 | 50.0000 | 59 | 36.8465 | 9.1853 | 50.0000 |
| 51.4481 | 17.3798 | 40.0000 | 84 | 49.4946 | 22.1419 | 40.0000 | | 40.6209 | −2.1550 | 50.0000 | 60 | 37.4450 | 9.6341 | 50.0000 |
| 51.8310 | 18.2326 | 40.0000 | 85 | 49.9256 | 22.7302 | 40.0000 | | 41.1977 | −1.3915 | 50.0000 | 61 | 38.0364 | 10.0922 | 50.0000 |
| 52.2093 | 19.0876 | 40.0000 | 86 | 50.3519 | 23.3225 | 40.0000 | | 41.7612 | −0.6186 | 50.0000 | 62 | 38.6209 | 10.5589 | 50.0000 |
| 52.5829 | 19.9442 | 40.0000 | 87 | 50.7721 | 23.9194 | 40.0000 | | 42.3140 | 0.1620 | 50.0000 | 63 | 39.1992 | 11.0341 | 50.0000 |
| 52.9535 | 20.8023 | 40.0000 | 88 | 51.1876 | 24.5194 | 40.0000 | | 42.8550 | 0.9512 | 50.0000 | 64 | 39.7698 | 11.5171 | 50.0000 |
| 53.3194 | 21.6620 | 40.0000 | 89 | 51.5969 | 25.1225 | 40.0000 | | 43.3853 | 1.7473 | 50.0000 | 65 | 40.3341 | 12.0085 | 50.0000 |
| 53.6822 | 22.5233 | 40.0000 | 90 | 52.0016 | 25.7302 | 40.0000 | | 43.9047 | 2.5512 | 50.0000 | 66 | 40.8915 | 12.5070 | 50.0000 |
| 54.0411 | 23.3868 | 40.0000 | 91 | 52.4008 | 26.3411 | 40.0000 | | 44.4140 | 3.3605 | 50.0000 | 67 | 41.4419 | 13.0132 | 50.0000 |
| 54.3969 | 24.2512 | 40.0000 | 92 | 52.7953 | 26.9543 | 40.0000 | | 44.9132 | 4.1767 | 50.0000 | 68 | 41.9860 | 13.5271 | 50.0000 |
| 54.7488 | 25.1163 | 40.0000 | 93 | 53.1845 | 27.5713 | 40.0000 | | 45.4031 | 4.9984 | 50.0000 | 69 | 42.5233 | 14.0473 | 50.0000 |
| 55.0984 | 25.9837 | 40.0000 | 94 | 53.5698 | 28.1915 | 40.0000 | | 45.8845 | 5.8248 | 50.0000 | 70 | 43.0535 | 14.5752 | 50.0000 |
| 55.4450 | 26.8512 | 40.0000 | 95 | 53.9504 | 28.8140 | 40.0000 | | 46.3566 | 6.6566 | 50.0000 | 71 | 43.5775 | 15.1085 | 50.0000 |
| 55.7884 | 27.7209 | 40.0000 | 96 | 54.3256 | 29.4395 | 40.0000 | | 46.8209 | 7.4938 | 50.0000 | 72 | 44.0946 | 15.6488 | 50.0000 |
| 56.1295 | 28.5907 | 40.0000 | 97 | 54.6961 | 30.0682 | 40.0000 | | 47.2775 | 8.3341 | 50.0000 | 73 | 44.6054 | 16.1953 | 50.0000 |
| 56.4674 | 29.4620 | 40.0000 | 98 | 55.0620 | 30.6992 | 40.0000 | | 47.7256 | 9.1791 | 50.0000 | 74 | 45.1093 | 16.7481 | 50.0000 |
| 56.7465 | 30.3488 | 40.0000 | 99 | 55.5884 | 31.1767 | 40.0000 | | 48.1674 | 10.0279 | 50.0000 | 75 | 45.6078 | 17.3062 | 50.0000 |
| 56.2946 | 31.1155 | 40.0000 | 100 | 56.2946 | 31.1155 | 40.0000 | | 48.6016 | 10.8806 | 50.0000 | 76 | 46.0992 | 17.8705 | 50.0000 |
| −3.4884 | −2.9395 | 50.0000 | 1 | −3.4884 | −2.9395 | 50.0000 | | 49.0295 | 11.7357 | 50.0000 | 77 | 46.5837 | 18.4395 | 50.0000 |
| −3.7566 | −3.8550 | 50.0000 | 2 | −3.1194 | −2.2899 | 50.0000 | | 49.4512 | 12.5946 | 50.0000 | 78 | 47.0628 | 19.0140 | 50.0000 |
| −3.7930 | −4.8085 | 50.0000 | 3 | −2.6341 | −1.7217 | 50.0000 | | 49.8659 | 13.4566 | 50.0000 | 79 | 47.5357 | 19.5938 | 50.0000 |
| −3.6333 | −5.7504 | 50.0000 | 4 | −2.0620 | −1.2411 | 50.0000 | | 50.2760 | 14.3209 | 50.0000 | 80 | 48.0023 | 20.1783 | 50.0000 |
| −3.3225 | −6.6543 | 50.0000 | 5 | −1.4295 | −0.8434 | 50.0000 | | 50.6798 | 15.1884 | 50.0000 | 81 | 48.4636 | 20.7674 | 50.0000 |
| −2.8977 | −7.5109 | 50.0000 | 6 | −0.7550 | −0.5209 | 50.0000 | | 51.0791 | 16.0581 | 50.0000 | 82 | 48.9186 | 21.3612 | 50.0000 |
| −2.3868 | −8.3194 | 50.0000 | 7 | −0.0527 | −0.2643 | 50.0000 | | 51.4729 | 16.9295 | 50.0000 | 83 | 49.3674 | 21.9589 | 50.0000 |
| −1.8085 | −9.0814 | 50.0000 | 8 | 0.6682 | −0.0643 | 50.0000 | | 51.8612 | 17.8039 | 50.0000 | 84 | 49.8109 | 22.5612 | 50.0000 |
| −1.1767 | −9.7992 | 50.0000 | 9 | 1.4008 | 0.0853 | 50.0000 | | 52.2457 | 18.6798 | 50.0000 | 85 | 50.2488 | 23.1682 | 50.0000 |
| −0.5016 | −10.4767 | 50.0000 | 10 | 2.1411 | 0.1899 | 50.0000 | | 52.6256 | 19.5581 | 50.0000 | 86 | 50.6814 | 23.7783 | 50.0000 |
| 0.2101 | −11.1163 | 50.0000 | 11 | 2.8868 | 0.2558 | 50.0000 | | 53.0016 | 20.4372 | 50.0000 | 87 | 51.1078 | 24.3930 | 50.0000 |
| 0.9519 | −11.7202 | 50.0000 | 12 | 3.6341 | 0.2837 | 50.0000 | | 53.3729 | 21.3194 | 50.0000 | 88 | 51.5295 | 25.0109 | 50.0000 |
| 1.7202 | −12.2891 | 50.0000 | 13 | 4.3822 | 0.2814 | 50.0000 | | 53.7403 | 22.2023 | 50.0000 | 89 | 51.9450 | 25.6326 | 50.0000 |
| 2.5124 | −12.8264 | 50.0000 | 14 | 5.1295 | 0.2527 | 50.0000 | | 54.1047 | 23.0868 | 50.0000 | 90 | 52.3558 | 26.2581 | 50.0000 |
| 3.3240 | −13.3326 | 50.0000 | 15 | 5.8760 | 0.2140 | 50.0000 | | 54.4643 | 23.9736 | 50.0000 | 91 | 52.7612 | 26.8868 | 50.0000 |
| 4.1543 | −13.8070 | 50.0000 | 16 | 6.6233 | 0.1806 | 50.0000 | | 54.8217 | 24.8605 | 50.0000 | 92 | 53.1612 | 27.5186 | 50.0000 |
| 5.0008 | −14.2527 | 50.0000 | 17 | 7.3713 | 0.1612 | 50.0000 | | 55.1752 | 25.7496 | 50.0000 | 93 | 53.5566 | 28.1535 | 50.0000 |

TABLE I-continued

| SUCTION-SIDE | | | | PRESSURE-SIDE | | |
|---|---|---|---|---|---|---|
| X (%) | Y (%) | Z (%) | N | X (%) | Y (%) | Z (%) |
| 55.5264 | 26.6395 | 50.0000 | 94 | 53.9473 | 28.7915 | 50.0000 |
| 55.8736 | 27.5310 | 50.0000 | 95 | 54.3333 | 29.4318 | 50.0000 |
| 56.2186 | 28.4233 | 50.0000 | 96 | 54.7147 | 30.0752 | 50.0000 |
| 56.5605 | 29.3171 | 50.0000 | 97 | 55.0907 | 30.7217 | 50.0000 |
| 56.8992 | 30.2116 | 50.0000 | 98 | 55.4628 | 31.3713 | 50.0000 |
| 57.1767 | 31.1209 | 50.0000 | 99 | 55.9636 | 31.9031 | 50.0000 |
| 56.6884 | 31.8876 | 50.0000 | 100 | 56.6884 | 31.8876 | 50.0000 |
| −4.3248 | −3.7442 | 60.0000 | 1 | −4.3248 | −3.7442 | 60.0000 |
| −4.5760 | −4.6868 | 60.0000 | 2 | −3.9620 | −3.0705 | 60.0000 |
| −4.5884 | −5.6620 | 60.0000 | 3 | −3.4775 | −2.4767 | 60.0000 |
| −4.3977 | −6.6202 | 60.0000 | 4 | −2.9016 | −1.9713 | 60.0000 |
| −4.0527 | −7.5341 | 60.0000 | 5 | −2.2612 | −1.5488 | 60.0000 |
| −3.5922 | −8.3961 | 60.0000 | 6 | −1.5775 | −1.2023 | 60.0000 |
| −3.0450 | −9.2062 | 60.0000 | 7 | −0.8643 | −0.9217 | 60.0000 |
| −2.4302 | −9.9667 | 60.0000 | 8 | −0.1302 | −0.6992 | 60.0000 |
| −1.7636 | −10.6814 | 60.0000 | 9 | 0.6178 | −0.5279 | 60.0000 |
| −1.0535 | −11.3535 | 60.0000 | 10 | 1.3736 | −0.4088 | 60.0000 |
| −0.3078 | −11.9868 | 60.0000 | 11 | 2.1364 | −0.3147 | 60.0000 |
| 0.4674 | −12.5822 | 60.0000 | 12 | 2.9016 | −0.2659 | 60.0000 |
| 1.2682 | −13.1434 | 60.0000 | 13 | 3.6682 | −0.2496 | 60.0000 |
| 2.0922 | −13.6705 | 60.0000 | 14 | 4.4357 | −0.2589 | 60.0000 |
| 2.9349 | −14.1659 | 60.0000 | 15 | 5.2023 | −0.2798 | 60.0000 |
| 3.7953 | −14.6302 | 60.0000 | 16 | 5.9690 | −0.2953 | 60.0000 |
| 4.6713 | −15.0643 | 60.0000 | 17 | 6.7364 | −0.2977 | 60.0000 |
| 5.5620 | −15.4682 | 60.0000 | 18 | 7.5031 | −0.2907 | 60.0000 |
| 6.4667 | −15.8403 | 60.0000 | 19 | 8.2705 | −0.2752 | 60.0000 |
| 7.3837 | −16.1798 | 60.0000 | 20 | 9.0372 | −0.2512 | 60.0000 |
| 8.3124 | −16.4853 | 60.0000 | 21 | 9.8031 | −0.2178 | 60.0000 |
| 9.2527 | −16.7543 | 60.0000 | 22 | 10.5690 | −0.1744 | 60.0000 |
| 10.2023 | −16.9868 | 60.0000 | 23 | 11.3341 | −0.1209 | 60.0000 |
| 11.1605 | −17.1814 | 60.0000 | 24 | 12.0992 | −0.0574 | 60.0000 |
| 12.1256 | −17.3380 | 60.0000 | 25 | 12.8628 | 0.0163 | 60.0000 |
| 13.0969 | −17.4535 | 60.0000 | 26 | 13.6248 | 0.1000 | 60.0000 |
| 14.0713 | −17.5295 | 60.0000 | 27 | 14.3860 | 0.1946 | 60.0000 |
| 15.0488 | −17.5651 | 60.0000 | 28 | 15.1457 | 0.3000 | 60.0000 |
| 16.0264 | −17.5589 | 60.0000 | 29 | 15.9047 | 0.4155 | 60.0000 |
| 17.0031 | −17.5124 | 60.0000 | 30 | 16.6605 | 0.5426 | 60.0000 |
| 17.9775 | −17.4256 | 60.0000 | 31 | 17.4155 | 0.6814 | 60.0000 |
| 18.9465 | −17.2984 | 60.0000 | 32 | 18.1674 | 0.8310 | 60.0000 |
| 19.9101 | −17.1326 | 60.0000 | 33 | 18.9178 | 0.9915 | 60.0000 |
| 20.8667 | −16.9279 | 60.0000 | 34 | 19.6651 | 1.1643 | 60.0000 |
| 21.8140 | −16.6853 | 60.0000 | 35 | 20.4101 | 1.3488 | 60.0000 |
| 22.7512 | −16.4070 | 60.0000 | 36 | 21.1512 | 1.5450 | 60.0000 |
| 23.6775 | −16.0938 | 60.0000 | 37 | 21.8899 | 1.7527 | 60.0000 |
| 24.5915 | −15.7465 | 60.0000 | 38 | 22.6248 | 1.9721 | 60.0000 |
| 25.4930 | −15.3674 | 60.0000 | 39 | 23.3566 | 2.2031 | 60.0000 |
| 26.3806 | −14.9574 | 60.0000 | 40 | 24.0837 | 2.4465 | 60.0000 |
| 27.2543 | −14.5178 | 60.0000 | 41 | 24.8070 | 2.7016 | 60.0000 |
| 28.1132 | −14.0504 | 60.0000 | 42 | 25.5264 | 2.9682 | 60.0000 |
| 28.9574 | −13.5566 | 60.0000 | 43 | 26.2411 | 3.2473 | 60.0000 |
| 29.7860 | −13.0380 | 60.0000 | 44 | 26.9512 | 3.5372 | 60.0000 |
| 30.5992 | −12.4953 | 60.0000 | 45 | 27.6558 | 3.8395 | 60.0000 |
| 31.3977 | −11.9302 | 60.0000 | 46 | 28.3558 | 4.1535 | 60.0000 |
| 32.1798 | −11.3434 | 60.0000 | 47 | 29.0504 | 4.4791 | 60.0000 |
| 32.9473 | −10.7372 | 60.0000 | 48 | 29.7395 | 4.8155 | 60.0000 |
| 33.6992 | −10.1116 | 60.0000 | 49 | 30.4233 | 5.1643 | 60.0000 |
| 34.4357 | −9.4690 | 60.0000 | 50 | 31.1008 | 5.5240 | 60.0000 |
| 35.1574 | −8.8085 | 60.0000 | 51 | 31.7721 | 5.8946 | 60.0000 |
| 35.8636 | −8.1326 | 60.0000 | 52 | 32.4380 | 6.2760 | 60.0000 |
| 36.5558 | −7.4419 | 60.0000 | 53 | 33.0969 | 6.6682 | 60.0000 |
| 37.2333 | −6.7364 | 60.0000 | 54 | 33.7504 | 7.0705 | 60.0000 |
| 37.8961 | −6.0178 | 60.0000 | 55 | 34.3961 | 7.4837 | 60.0000 |
| 38.5450 | −5.2860 | 60.0000 | 56 | 35.0364 | 7.9070 | 60.0000 |
| 39.1806 | −4.5426 | 60.0000 | 57 | 35.6690 | 8.3403 | 60.0000 |
| 39.8023 | −3.7876 | 60.0000 | 58 | 36.2953 | 8.7837 | 60.0000 |
| 40.4101 | −3.0225 | 60.0000 | 59 | 36.9147 | 9.2364 | 60.0000 |
| 41.0054 | −2.2465 | 60.0000 | 60 | 37.5271 | 9.6984 | 60.0000 |
| 41.5876 | −1.4605 | 60.0000 | 61 | 38.1326 | 10.1690 | 60.0000 |
| 42.1581 | −0.6659 | 60.0000 | 62 | 38.7310 | 10.6488 | 60.0000 |
| 42.7155 | 0.1372 | 60.0000 | 63 | 39.3225 | 11.1372 | 60.0000 |
| 43.2620 | 0.9481 | 60.0000 | 64 | 39.9070 | 11.6341 | 60.0000 |
| 43.7969 | 1.7667 | 60.0000 | 65 | 40.4845 | 12.1395 | 60.0000 |
| 44.3209 | 2.5922 | 60.0000 | 66 | 41.0543 | 12.6527 | 60.0000 |
| 44.8341 | 3.4248 | 60.0000 | 67 | 41.6178 | 13.1729 | 60.0000 |
| 45.3380 | 4.2628 | 60.0000 | 68 | 42.1744 | 13.7016 | 60.0000 |
| 45.8318 | 5.1070 | 60.0000 | 69 | 42.7233 | 14.2364 | 60.0000 |
| 46.3163 | 5.9566 | 60.0000 | 70 | 43.2659 | 14.7791 | 60.0000 |
| 46.7915 | 6.8109 | 60.0000 | 71 | 43.8016 | 15.3279 | 60.0000 |
| 47.2589 | 7.6698 | 60.0000 | 72 | 44.3302 | 15.8837 | 60.0000 |
| 47.7178 | 8.5333 | 60.0000 | 73 | 44.8519 | 16.4465 | 60.0000 |
| 48.1690 | 9.4008 | 60.0000 | 74 | 45.3674 | 17.0147 | 60.0000 |
| 48.6132 | 10.2721 | 60.0000 | 75 | 45.8752 | 17.5891 | 60.0000 |
| 49.0496 | 11.1473 | 60.0000 | 76 | 46.3775 | 18.1690 | 60.0000 |
| 49.4798 | 12.0256 | 60.0000 | 77 | 46.8729 | 18.7550 | 60.0000 |
| 49.9031 | 12.9070 | 60.0000 | 78 | 47.3612 | 19.3465 | 60.0000 |
| 50.3209 | 13.7915 | 60.0000 | 79 | 47.8434 | 19.9426 | 60.0000 |
| 50.7318 | 14.6783 | 60.0000 | 80 | 48.3202 | 20.5442 | 60.0000 |
| 51.1380 | 15.5682 | 60.0000 | 81 | 48.7899 | 21.1504 | 60.0000 |
| 51.5380 | 16.4605 | 60.0000 | 82 | 49.2535 | 21.7612 | 60.0000 |
| 51.9333 | 17.3550 | 60.0000 | 83 | 49.7109 | 22.3775 | 60.0000 |
| 52.3240 | 18.2512 | 60.0000 | 84 | 50.1628 | 22.9969 | 60.0000 |
| 52.7093 | 19.1504 | 60.0000 | 85 | 50.6085 | 23.6209 | 60.0000 |
| 53.0907 | 20.0504 | 60.0000 | 86 | 51.0488 | 24.2496 | 60.0000 |
| 53.4674 | 20.9527 | 60.0000 | 87 | 51.4829 | 24.8822 | 60.0000 |
| 53.8403 | 21.8574 | 60.0000 | 88 | 51.9116 | 25.5178 | 60.0000 |
| 54.2093 | 22.7628 | 60.0000 | 89 | 52.3349 | 26.1581 | 60.0000 |
| 54.5736 | 23.6698 | 60.0000 | 90 | 52.7527 | 26.8016 | 60.0000 |
| 54.9357 | 24.5783 | 60.0000 | 91 | 53.1651 | 27.4481 | 60.0000 |
| 55.2938 | 25.4884 | 60.0000 | 92 | 53.5721 | 28.0984 | 60.0000 |
| 55.6481 | 26.4000 | 60.0000 | 93 | 53.9744 | 28.7512 | 60.0000 |
| 56.0000 | 27.3124 | 60.0000 | 94 | 54.3713 | 29.4078 | 60.0000 |
| 56.3481 | 28.2264 | 60.0000 | 95 | 54.7636 | 30.0674 | 60.0000 |
| 56.6938 | 29.1411 | 60.0000 | 96 | 55.1504 | 30.7295 | 60.0000 |
| 57.0364 | 30.0566 | 60.0000 | 97 | 55.5326 | 31.3946 | 60.0000 |
| 57.3767 | 30.9736 | 60.0000 | 98 | 55.9109 | 32.0620 | 60.0000 |
| 57.6504 | 31.9054 | 60.0000 | 99 | 56.3899 | 32.6434 | 60.0000 |
| 57.1302 | 32.6729 | 60.0000 | 100 | 57.1302 | 32.6729 | 60.0000 |
| −5.1674 | −4.5023 | 70.0000 | 1 | −5.1674 | −4.5023 | 70.0000 |
| −5.4225 | −5.4651 | 70.0000 | 2 | −4.7977 | −3.8101 | 70.0000 |
| −5.4295 | −6.4612 | 70.0000 | 3 | −4.3054 | −3.1992 | 70.0000 |
| −5.2225 | −7.4364 | 70.0000 | 4 | −3.7217 | −2.6736 | 70.0000 |
| −4.8519 | −8.3628 | 70.0000 | 5 | −3.0736 | −2.2302 | 70.0000 |
| −4.3612 | −9.2318 | 70.0000 | 6 | −2.3806 | −1.8605 | 70.0000 |
| −3.7814 | −10.0442 | 70.0000 | 7 | −1.6566 | −1.5550 | 70.0000 |
| −3.1326 | −10.8031 | 70.0000 | 8 | −0.9109 | −1.3070 | 70.0000 |
| −2.4310 | −11.5132 | 70.0000 | 9 | −0.1504 | −1.1093 | 70.0000 |
| −1.6860 | −12.1783 | 70.0000 | 10 | 0.6202 | −0.9566 | 70.0000 |
| −0.9062 | −12.8023 | 70.0000 | 11 | 1.3984 | −0.8442 | 70.0000 |
| −0.0969 | −13.3868 | 70.0000 | 12 | 2.1806 | −0.7690 | 70.0000 |
| 0.7372 | −13.9364 | 70.0000 | 13 | 2.9651 | −0.7264 | 70.0000 |
| 1.5930 | −14.4504 | 70.0000 | 14 | 3.7504 | −0.7093 | 70.0000 |
| 2.4674 | −14.9326 | 70.0000 | 15 | 4.5364 | −0.7039 | 70.0000 |
| 3.3589 | −15.3829 | 70.0000 | 16 | 5.3225 | −0.6922 | 70.0000 |
| 4.2643 | −15.8031 | 70.0000 | 17 | 6.1078 | −0.6690 | 70.0000 |
| 5.1837 | −16.1922 | 70.0000 | 18 | 6.8930 | −0.6372 | 70.0000 |
| 6.1163 | −16.5496 | 70.0000 | 19 | 7.6783 | −0.5977 | 70.0000 |
| 7.0605 | −16.8744 | 70.0000 | 20 | 8.4628 | −0.5512 | 70.0000 |
| 8.0155 | −17.1659 | 70.0000 | 21 | 9.2465 | −0.4961 | 70.0000 |
| 8.9814 | −17.4209 | 70.0000 | 22 | 10.0295 | −0.4318 | 70.0000 |
| 9.9550 | −17.6403 | 70.0000 | 23 | 10.8124 | −0.3581 | 70.0000 |
| 10.9372 | −17.8217 | 70.0000 | 24 | 11.5938 | −0.2752 | 70.0000 |
| 11.9256 | −17.9643 | 70.0000 | 25 | 12.3744 | −0.1837 | 70.0000 |
| 12.9186 | −18.0682 | 70.0000 | 26 | 13.1535 | −0.0814 | 70.0000 |
| 13.9155 | −18.1318 | 70.0000 | 27 | 13.9318 | 0.0302 | 70.0000 |
| 14.9132 | −18.1550 | 70.0000 | 28 | 14.7078 | 0.1512 | 70.0000 |
| 15.9116 | −18.1388 | 70.0000 | 29 | 15.4829 | 0.2829 | 70.0000 |
| 16.9085 | −18.0806 | 70.0000 | 30 | 16.2558 | 0.4248 | 70.0000 |
| 17.9023 | −17.9829 | 70.0000 | 31 | 17.0264 | 0.5775 | 70.0000 |
| 18.8915 | −17.8457 | 70.0000 | 32 | 17.7953 | 0.7403 | 70.0000 |
| 19.8744 | −17.6690 | 70.0000 | 33 | 18.5620 | 0.9147 | 70.0000 |
| 20.8496 | −17.4535 | 70.0000 | 34 | 19.3256 | 1.0992 | 70.0000 |
| 21.8155 | −17.2008 | 70.0000 | 35 | 20.0868 | 1.2953 | 70.0000 |
| 22.7713 | −16.9124 | 70.0000 | 36 | 20.8450 | 1.5031 | 70.0000 |
| 23.7155 | −16.5884 | 70.0000 | 37 | 21.5992 | 1.7209 | 70.0000 |
| 24.6481 | −16.2302 | 70.0000 | 38 | 22.3512 | 1.9512 | 70.0000 |
| 25.5674 | −15.8403 | 70.0000 | 39 | 23.0992 | 2.1922 | 70.0000 |
| 26.4721 | −15.4186 | 70.0000 | 40 | 23.8434 | 2.4450 | 70.0000 |
| 27.3628 | −14.9674 | 70.0000 | 41 | 24.5829 | 2.7093 | 70.0000 |
| 28.2388 | −14.4884 | 70.0000 | 42 | 25.3194 | 2.9853 | 70.0000 |
| 29.1000 | −13.9814 | 70.0000 | 43 | 26.0504 | 3.2729 | 70.0000 |
| 29.9450 | −13.4496 | 70.0000 | 44 | 26.7775 | 3.5713 | 70.0000 |
| 30.7744 | −12.8938 | 70.0000 | 45 | 27.4992 | 3.8822 | 70.0000 |

TABLE I-continued

| SUCTION-SIDE | | | | PRESSURE-SIDE | | |
|---|---|---|---|---|---|---|
| X (%) | Y (%) | Z (%) | N | X (%) | Y (%) | Z (%) |
| 31.5876 | −12.3140 | 70.0000 | 46 | 28.2163 | 4.2047 | 70.0000 |
| 32.3853 | −11.7132 | 70.0000 | 47 | 28.9279 | 4.5380 | 70.0000 |
| 33.1667 | −11.0922 | 70.0000 | 48 | 29.6341 | 4.8829 | 70.0000 |
| 33.9326 | −10.4512 | 70.0000 | 49 | 30.3341 | 5.2388 | 70.0000 |
| 34.6829 | −9.7922 | 70.0000 | 50 | 31.0287 | 5.6062 | 70.0000 |
| 35.4178 | −9.1163 | 70.0000 | 51 | 31.7178 | 5.9853 | 70.0000 |
| 36.1372 | −8.4233 | 70.0000 | 52 | 32.4000 | 6.3744 | 70.0000 |
| 36.8411 | −7.7147 | 70.0000 | 53 | 33.0760 | 6.7752 | 70.0000 |
| 37.5302 | −6.9922 | 70.0000 | 54 | 33.7457 | 7.1860 | 70.0000 |
| 38.2039 | −6.2558 | 70.0000 | 55 | 34.4093 | 7.6078 | 70.0000 |
| 38.8636 | −5.5062 | 70.0000 | 56 | 35.0659 | 8.0395 | 70.0000 |
| 39.5093 | −4.7442 | 70.0000 | 57 | 35.7155 | 8.4822 | 70.0000 |
| 40.1403 | −3.9698 | 70.0000 | 58 | 36.3581 | 8.9341 | 70.0000 |
| 40.7574 | −3.1853 | 70.0000 | 59 | 36.9946 | 9.3953 | 70.0000 |
| 41.3612 | −2.3899 | 70.0000 | 60 | 37.6233 | 9.8667 | 70.0000 |
| 41.9519 | −1.5845 | 70.0000 | 61 | 38.2450 | 10.3481 | 70.0000 |
| 42.5295 | −0.7698 | 70.0000 | 62 | 38.8597 | 10.8380 | 70.0000 |
| 43.0938 | 0.0535 | 70.0000 | 63 | 39.4667 | 11.3364 | 70.0000 |
| 43.6465 | 0.8853 | 70.0000 | 64 | 40.0667 | 11.8442 | 70.0000 |
| 44.1876 | 1.7248 | 70.0000 | 65 | 40.6597 | 12.3597 | 70.0000 |
| 44.7178 | 2.5713 | 70.0000 | 66 | 41.2450 | 12.8845 | 70.0000 |
| 45.2364 | 3.4240 | 70.0000 | 67 | 41.8233 | 13.4163 | 70.0000 |
| 45.7450 | 4.2837 | 70.0000 | 68 | 42.3938 | 13.9566 | 70.0000 |
| 46.2434 | 5.1488 | 70.0000 | 69 | 42.9574 | 14.5047 | 70.0000 |
| 46.7326 | 6.0202 | 70.0000 | 70 | 43.5140 | 15.0597 | 70.0000 |
| 47.2124 | 6.8953 | 70.0000 | 71 | 44.0628 | 15.6217 | 70.0000 |
| 47.6829 | 7.7760 | 70.0000 | 72 | 44.6054 | 16.1907 | 70.0000 |
| 48.1457 | 8.6612 | 70.0000 | 73 | 45.1395 | 16.7667 | 70.0000 |
| 48.6000 | 9.5504 | 70.0000 | 74 | 45.6674 | 17.3488 | 70.0000 |
| 49.0473 | 10.4434 | 70.0000 | 75 | 46.1884 | 17.9372 | 70.0000 |
| 49.4868 | 11.3403 | 70.0000 | 76 | 46.7023 | 18.5326 | 70.0000 |
| 49.9194 | 12.2403 | 70.0000 | 77 | 47.2085 | 19.1326 | 70.0000 |
| 50.3450 | 13.1434 | 70.0000 | 78 | 47.7085 | 19.7395 | 70.0000 |
| 50.7643 | 14.0496 | 70.0000 | 79 | 48.2023 | 20.3512 | 70.0000 |
| 51.1783 | 14.9589 | 70.0000 | 80 | 48.6884 | 20.9682 | 70.0000 |
| 51.5860 | 15.8698 | 70.0000 | 81 | 49.1690 | 21.5907 | 70.0000 |
| 51.9884 | 16.7837 | 70.0000 | 82 | 49.6419 | 22.2178 | 70.0000 |
| 52.3853 | 17.7000 | 70.0000 | 83 | 50.1093 | 22.8496 | 70.0000 |
| 52.7775 | 18.6186 | 70.0000 | 84 | 50.5698 | 23.4860 | 70.0000 |
| 53.1643 | 19.5395 | 70.0000 | 85 | 51.0248 | 24.1271 | 70.0000 |
| 53.5473 | 20.4620 | 70.0000 | 86 | 51.4729 | 24.7729 | 70.0000 |
| 53.9256 | 21.3860 | 70.0000 | 87 | 51.9155 | 25.4225 | 70.0000 |
| 54.2992 | 22.3116 | 70.0000 | 88 | 52.3519 | 26.0760 | 70.0000 |
| 54.6698 | 23.2395 | 70.0000 | 89 | 52.7829 | 26.7333 | 70.0000 |
| 55.0357 | 24.1682 | 70.0000 | 90 | 53.2078 | 27.3946 | 70.0000 |
| 55.3984 | 25.0984 | 70.0000 | 91 | 53.6271 | 28.0589 | 70.0000 |
| 55.7574 | 26.0302 | 70.0000 | 92 | 54.0411 | 28.7271 | 70.0000 |
| 56.1132 | 26.9636 | 70.0000 | 93 | 54.4488 | 29.3984 | 70.0000 |
| 56.4659 | 27.8977 | 70.0000 | 94 | 54.8519 | 30.0729 | 70.0000 |
| 56.8155 | 28.8333 | 70.0000 | 95 | 55.2496 | 30.7512 | 70.0000 |
| 57.1612 | 29.7698 | 70.0000 | 96 | 55.6426 | 31.4318 | 70.0000 |
| 57.5047 | 30.7078 | 70.0000 | 97 | 56.0302 | 32.1155 | 70.0000 |
| 57.8457 | 31.6465 | 70.0000 | 98 | 56.4132 | 32.8016 | 70.0000 |
| 58.1419 | 32.5961 | 70.0000 | 99 | 56.9008 | 33.3984 | 70.0000 |
| 57.6581 | 33.4078 | 70.0000 | 100 | 57.6581 | 33.4078 | 70.0000 |
| −6.0465 | −5.2574 | 80.0000 | 1 | −6.0465 | −5.2574 | 80.0000 |
| −6.3109 | −6.2403 | 80.0000 | 2 | −5.6690 | −4.5504 | 80.0000 |
| −6.3178 | −7.2589 | 80.0000 | 3 | −5.1698 | −3.9217 | 80.0000 |
| −6.0977 | −8.2535 | 80.0000 | 4 | −4.5814 | −3.3760 | 80.0000 |
| −5.7031 | −9.1938 | 80.0000 | 5 | −3.9287 | −2.9085 | 80.0000 |
| −5.1806 | −10.0705 | 80.0000 | 6 | −3.2302 | −2.5116 | 80.0000 |
| −4.5643 | −10.8837 | 80.0000 | 7 | −2.5000 | −2.1767 | 80.0000 |
| −3.8783 | −11.6388 | 80.0000 | 8 | −1.7473 | −1.8899 | 80.0000 |
| −3.1380 | −12.3419 | 80.0000 | 9 | −0.9775 | −1.6667 | 80.0000 |
| −2.3550 | −12.9961 | 80.0000 | 10 | −0.1961 | −1.4806 | 80.0000 |
| −1.5372 | −13.6070 | 80.0000 | 11 | 0.5930 | −1.3349 | 80.0000 |
| −0.6907 | −14.1767 | 80.0000 | 12 | 1.3891 | −1.2256 | 80.0000 |
| 0.1798 | −14.7093 | 80.0000 | 13 | 2.1891 | −1.1481 | 80.0000 |
| 1.0713 | −15.2070 | 80.0000 | 14 | 2.9907 | −1.0977 | 80.0000 |
| 1.9806 | −15.6705 | 80.0000 | 15 | 3.7930 | −1.0574 | 80.0000 |
| 2.9054 | −16.1023 | 80.0000 | 16 | 4.5946 | −1.0124 | 80.0000 |
| 3.8442 | −16.5031 | 80.0000 | 17 | 5.3961 | −0.9574 | 80.0000 |
| 4.7953 | −16.8736 | 80.0000 | 18 | 6.1969 | −0.8953 | 80.0000 |
| 5.7581 | −17.2124 | 80.0000 | 19 | 6.9977 | −0.8279 | 80.0000 |
| 6.7318 | −17.5186 | 80.0000 | 20 | 7.7977 | −0.7535 | 80.0000 |
| 7.7155 | −17.7915 | 80.0000 | 21 | 8.5969 | −0.6713 | 80.0000 |
| 8.7085 | −18.0295 | 80.0000 | 22 | 9.3953 | −0.5822 | 80.0000 |
| 9.7085 | −18.2318 | 80.0000 | 23 | 10.1922 | −0.4853 | 80.0000 |
| 10.7163 | −18.3969 | 80.0000 | 24 | 10.9891 | −0.3798 | 80.0000 |
| 11.7287 | −18.5233 | 80.0000 | 25 | 11.7845 | −0.2667 | 80.0000 |
| 12.7457 | −18.6124 | 80.0000 | 26 | 12.5783 | −0.1457 | 80.0000 |
| 13.7651 | −18.6620 | 80.0000 | 27 | 13.3713 | −0.0155 | 80.0000 |
| 14.7860 | −18.6721 | 80.0000 | 28 | 14.1620 | 0.1240 | 80.0000 |
| 15.8062 | −18.6419 | 80.0000 | 29 | 14.9519 | 0.2721 | 80.0000 |
| 16.8248 | −18.5721 | 80.0000 | 30 | 15.7395 | 0.4295 | 80.0000 |
| 17.8395 | −18.4636 | 80.0000 | 31 | 16.5256 | 0.5961 | 80.0000 |
| 18.8496 | −18.3147 | 80.0000 | 32 | 17.3093 | 0.7729 | 80.0000 |
| 19.8527 | −18.1271 | 80.0000 | 33 | 18.0907 | 0.9589 | 80.0000 |
| 20.8481 | −17.9016 | 80.0000 | 34 | 18.8698 | 1.1550 | 80.0000 |
| 21.8341 | −17.6395 | 80.0000 | 35 | 19.6457 | 1.3620 | 80.0000 |
| 22.8109 | −17.3403 | 80.0000 | 36 | 20.4194 | 1.5783 | 80.0000 |
| 23.7752 | −17.0070 | 80.0000 | 37 | 21.1899 | 1.8062 | 80.0000 |
| 24.7271 | −16.6388 | 80.0000 | 38 | 21.9574 | 2.0442 | 80.0000 |
| 25.6659 | −16.2380 | 80.0000 | 39 | 22.7209 | 2.2922 | 80.0000 |
| 26.5907 | −15.8062 | 80.0000 | 40 | 23.4814 | 2.5519 | 80.0000 |
| 27.5008 | −15.3442 | 80.0000 | 41 | 24.2380 | 2.8225 | 80.0000 |
| 28.3961 | −14.8535 | 80.0000 | 42 | 24.9907 | 3.1039 | 80.0000 |
| 29.2752 | −14.3349 | 80.0000 | 43 | 25.7388 | 3.3961 | 80.0000 |
| 30.1388 | −13.7907 | 80.0000 | 44 | 26.4822 | 3.6992 | 80.0000 |
| 30.9860 | −13.2217 | 80.0000 | 45 | 27.2217 | 4.0140 | 80.0000 |
| 31.8178 | −12.6295 | 80.0000 | 46 | 27.9558 | 4.3403 | 80.0000 |
| 32.6326 | −12.0147 | 80.0000 | 47 | 28.6853 | 4.6775 | 80.0000 |
| 33.4310 | −11.3791 | 80.0000 | 48 | 29.4093 | 5.0256 | 80.0000 |
| 34.2132 | −10.7233 | 80.0000 | 49 | 30.1271 | 5.3845 | 80.0000 |
| 34.9791 | −10.0488 | 80.0000 | 50 | 30.8403 | 5.7550 | 80.0000 |
| 35.7295 | −9.3566 | 80.0000 | 51 | 31.5473 | 6.1364 | 80.0000 |
| 36.4636 | −8.6465 | 80.0000 | 52 | 32.2481 | 6.5287 | 80.0000 |
| 37.1814 | −7.9217 | 80.0000 | 53 | 32.9434 | 6.9318 | 80.0000 |
| 37.8845 | −7.1814 | 80.0000 | 54 | 33.6318 | 7.3457 | 80.0000 |
| 38.5713 | −6.4264 | 80.0000 | 55 | 34.3140 | 7.7705 | 80.0000 |
| 39.2434 | −5.6581 | 80.0000 | 56 | 34.9891 | 8.2054 | 80.0000 |
| 39.9000 | −4.8767 | 80.0000 | 57 | 35.6574 | 8.6504 | 80.0000 |
| 40.5426 | −4.0829 | 80.0000 | 58 | 36.3194 | 9.1062 | 80.0000 |
| 41.1705 | −3.2783 | 80.0000 | 59 | 36.9736 | 9.5721 | 80.0000 |
| 41.7837 | −2.4628 | 80.0000 | 60 | 37.6217 | 10.0473 | 80.0000 |
| 42.3837 | −1.6364 | 80.0000 | 61 | 38.2620 | 10.5326 | 80.0000 |
| 42.9698 | −0.8008 | 80.0000 | 62 | 38.8946 | 11.0271 | 80.0000 |
| 43.5426 | 0.0442 | 80.0000 | 63 | 39.5202 | 11.5310 | 80.0000 |
| 44.1023 | 0.8977 | 80.0000 | 64 | 40.1388 | 12.0442 | 80.0000 |
| 44.6504 | 1.7589 | 80.0000 | 65 | 40.7496 | 12.5659 | 80.0000 |
| 45.1868 | 2.6271 | 80.0000 | 66 | 41.3527 | 13.0961 | 80.0000 |
| 45.7116 | 3.5023 | 80.0000 | 67 | 41.9481 | 13.6357 | 80.0000 |
| 46.2264 | 4.3845 | 80.0000 | 68 | 42.5364 | 14.1829 | 80.0000 |
| 46.7295 | 5.2721 | 80.0000 | 69 | 43.1163 | 14.7380 | 80.0000 |
| 47.2233 | 6.1659 | 80.0000 | 70 | 43.6891 | 15.3016 | 80.0000 |
| 47.7078 | 7.0643 | 80.0000 | 71 | 44.2550 | 15.8721 | 80.0000 |
| 48.1822 | 7.9682 | 80.0000 | 72 | 44.8124 | 16.4504 | 80.0000 |
| 48.6488 | 8.8760 | 80.0000 | 73 | 45.3628 | 17.0357 | 80.0000 |
| 49.1070 | 9.7884 | 80.0000 | 74 | 45.9054 | 17.6279 | 80.0000 |
| 49.5566 | 10.7047 | 80.0000 | 75 | 46.4411 | 18.2271 | 80.0000 |
| 49.9992 | 11.6240 | 80.0000 | 76 | 46.9690 | 18.8326 | 80.0000 |
| 50.4349 | 12.5473 | 80.0000 | 77 | 47.4891 | 19.4442 | 80.0000 |
| 50.8636 | 13.4744 | 80.0000 | 78 | 48.0023 | 20.0620 | 80.0000 |
| 51.2853 | 14.4039 | 80.0000 | 79 | 48.5085 | 20.6860 | 80.0000 |
| 51.7016 | 15.3357 | 80.0000 | 80 | 49.0078 | 21.3155 | 80.0000 |
| 52.1109 | 16.2705 | 80.0000 | 81 | 49.5000 | 21.9504 | 80.0000 |
| 52.5155 | 17.2078 | 80.0000 | 82 | 49.9845 | 22.5907 | 80.0000 |
| 52.9140 | 18.1473 | 80.0000 | 83 | 50.4628 | 23.2364 | 80.0000 |
| 53.3078 | 19.0891 | 80.0000 | 84 | 50.9341 | 23.8868 | 80.0000 |
| 53.6969 | 20.0333 | 80.0000 | 85 | 51.3992 | 24.5419 | 80.0000 |
| 54.0806 | 20.9791 | 80.0000 | 86 | 51.8574 | 25.2023 | 80.0000 |
| 54.4605 | 21.9264 | 80.0000 | 87 | 52.3093 | 25.8659 | 80.0000 |
| 54.8357 | 22.8760 | 80.0000 | 88 | 52.7543 | 26.5349 | 80.0000 |
| 55.2070 | 23.8264 | 80.0000 | 89 | 53.1938 | 27.2078 | 80.0000 |
| 55.5744 | 24.7791 | 80.0000 | 90 | 53.6271 | 27.8837 | 80.0000 |
| 55.9388 | 25.7326 | 80.0000 | 91 | 54.0543 | 28.5643 | 80.0000 |
| 56.2984 | 26.6876 | 80.0000 | 92 | 54.4752 | 29.2481 | 80.0000 |
| 56.6558 | 27.6442 | 80.0000 | 93 | 54.8907 | 29.9357 | 80.0000 |
| 57.0093 | 28.6016 | 80.0000 | 94 | 55.3000 | 30.6271 | 80.0000 |
| 57.3597 | 29.5605 | 80.0000 | 95 | 55.7039 | 31.3217 | 80.0000 |
| 57.7070 | 30.5202 | 80.0000 | 96 | 56.1023 | 32.0194 | 80.0000 |
| 58.0512 | 31.4814 | 80.0000 | 97 | 56.4953 | 32.7202 | 80.0000 |

TABLE I-continued

| SUCTION-SIDE | | | N | PRESSURE-SIDE | | |
|---|---|---|---|---|---|---|
| X (%) | Y (%) | Z (%) | | X (%) | Y (%) | Z (%) |
| 58.3930 | 32.4434 | 80.0000 | 98 | 56.8837 | 33.4233 | 80.0000 |
| 58.6628 | 33.4202 | 80.0000 | 99 | 57.3295 | 34.0822 | 80.0000 |
| 58.0922 | 34.1961 | 80.0000 | 100 | 58.0922 | 34.1961 | 80.0000 |
| −6.9566 | −6.0101 | 90.0000 | 1 | −6.9566 | −6.0101 | 90.0000 |
| −7.2380 | −7.0124 | 90.0000 | 2 | −6.5682 | −5.2868 | 90.0000 |
| −7.2558 | −8.0527 | 90.0000 | 3 | −6.0628 | −4.6395 | 90.0000 |
| −7.0326 | −9.0698 | 90.0000 | 4 | −5.4705 | −4.0698 | 90.0000 |
| −6.6209 | −10.0271 | 90.0000 | 5 | −4.8155 | −3.5729 | 90.0000 |
| −6.0705 | −10.9124 | 90.0000 | 6 | −4.1147 | −3.1434 | 90.0000 |
| −5.4209 | −11.7279 | 90.0000 | 7 | −3.3806 | −2.7729 | 90.0000 |
| −4.6969 | −12.4791 | 90.0000 | 8 | −2.6217 | −2.4558 | 90.0000 |
| −3.9178 | −13.1721 | 90.0000 | 9 | −1.8450 | −2.1860 | 90.0000 |
| −3.0946 | −13.8132 | 90.0000 | 10 | −1.0543 | −1.9597 | 90.0000 |
| −2.2372 | −14.4070 | 90.0000 | 11 | −0.2535 | −1.7729 | 90.0000 |
| −1.3512 | −14.9581 | 90.0000 | 12 | 0.5543 | −1.6225 | 90.0000 |
| −0.4419 | −15.4690 | 90.0000 | 13 | 1.3682 | −1.5047 | 90.0000 |
| 0.4868 | −15.9442 | 90.0000 | 14 | 2.1860 | −1.4132 | 90.0000 |
| 1.4326 | −16.3845 | 90.0000 | 15 | 3.0039 | −1.3326 | 90.0000 |
| 2.3930 | −16.7915 | 90.0000 | 16 | 3.8217 | −1.2473 | 90.0000 |
| 3.3659 | −17.1682 | 90.0000 | 17 | 4.6395 | −1.1543 | 90.0000 |
| 4.3504 | −17.5147 | 90.0000 | 18 | 5.4558 | −1.0566 | 90.0000 |
| 5.3450 | −17.8295 | 90.0000 | 19 | 6.2721 | −0.9550 | 90.0000 |
| 6.3488 | −18.1124 | 90.0000 | 20 | 7.0876 | −0.8488 | 90.0000 |
| 7.3612 | −18.3628 | 90.0000 | 21 | 7.9023 | −0.7364 | 90.0000 |
| 8.3822 | −18.5791 | 90.0000 | 22 | 8.7155 | −0.6178 | 90.0000 |
| 9.4093 | −18.7612 | 90.0000 | 23 | 9.5287 | −0.4938 | 90.0000 |
| 10.4426 | −18.9070 | 90.0000 | 24 | 10.3403 | −0.3628 | 90.0000 |
| 11.4798 | −19.0155 | 90.0000 | 25 | 11.1512 | −0.2248 | 90.0000 |
| 12.5209 | −19.0876 | 90.0000 | 26 | 11.9612 | −0.0806 | 90.0000 |
| 13.5636 | −19.1217 | 90.0000 | 27 | 12.7690 | 0.0705 | 90.0000 |
| 14.6062 | −19.1178 | 90.0000 | 28 | 13.5760 | 0.2295 | 90.0000 |
| 15.6488 | −19.0752 | 90.0000 | 29 | 14.3814 | 0.3953 | 90.0000 |
| 16.6891 | −18.9938 | 90.0000 | 30 | 15.1853 | 0.5698 | 90.0000 |
| 17.7248 | −18.8744 | 90.0000 | 31 | 15.9868 | 0.7527 | 90.0000 |
| 18.7566 | −18.7171 | 90.0000 | 32 | 16.7868 | 0.9442 | 90.0000 |
| 19.7814 | −18.5209 | 90.0000 | 33 | 17.5845 | 1.1434 | 90.0000 |
| 20.7977 | −18.2884 | 90.0000 | 34 | 18.3806 | 1.3519 | 90.0000 |
| 21.8054 | −18.0186 | 90.0000 | 35 | 19.1736 | 1.5690 | 90.0000 |
| 22.8031 | −17.7124 | 90.0000 | 36 | 19.9636 | 1.7953 | 90.0000 |
| 23.7891 | −17.3721 | 90.0000 | 37 | 20.7519 | 2.0318 | 90.0000 |
| 24.7628 | −16.9977 | 90.0000 | 38 | 21.5364 | 2.2775 | 90.0000 |
| 25.7233 | −16.5907 | 90.0000 | 39 | 22.3178 | 2.5333 | 90.0000 |
| 26.6698 | −16.1519 | 90.0000 | 40 | 23.0961 | 2.7984 | 90.0000 |
| 27.6016 | −15.6829 | 90.0000 | 41 | 23.8713 | 3.0744 | 90.0000 |
| 28.5186 | −15.1845 | 90.0000 | 42 | 24.6426 | 3.3605 | 90.0000 |
| 29.4194 | −14.6581 | 90.0000 | 43 | 25.4093 | 3.6566 | 90.0000 |
| 30.3039 | −14.1054 | 90.0000 | 44 | 26.1721 | 3.9636 | 90.0000 |
| 31.1721 | −13.5279 | 90.0000 | 45 | 26.9310 | 4.2814 | 90.0000 |
| 32.0240 | −12.9256 | 90.0000 | 46 | 27.6853 | 4.6093 | 90.0000 |
| 32.8589 | −12.3000 | 90.0000 | 47 | 28.4341 | 4.9481 | 90.0000 |
| 33.6775 | −11.6527 | 90.0000 | 48 | 29.1783 | 5.2984 | 90.0000 |
| 34.4791 | −10.9853 | 90.0000 | 49 | 29.9178 | 5.6589 | 90.0000 |
| 35.2643 | −10.2977 | 90.0000 | 50 | 30.6512 | 6.0302 | 90.0000 |
| 36.0326 | −9.5922 | 90.0000 | 51 | 31.3791 | 6.4124 | 90.0000 |
| 36.7837 | −8.8690 | 90.0000 | 52 | 32.1016 | 6.8054 | 90.0000 |
| 37.5194 | −8.1287 | 90.0000 | 53 | 32.8178 | 7.2101 | 90.0000 |
| 38.2380 | −7.3729 | 90.0000 | 54 | 33.5279 | 7.6248 | 90.0000 |
| 38.9411 | −6.6016 | 90.0000 | 55 | 34.2318 | 8.0504 | 90.0000 |
| 39.6279 | −5.8163 | 90.0000 | 56 | 34.9287 | 8.4868 | 90.0000 |
| 40.2992 | −5.0178 | 90.0000 | 57 | 35.6194 | 8.9333 | 90.0000 |
| 40.9550 | −4.2070 | 90.0000 | 58 | 36.3031 | 9.3907 | 90.0000 |
| 41.5953 | −3.3829 | 90.0000 | 59 | 36.9791 | 9.8581 | 90.0000 |
| 42.2217 | −2.5481 | 90.0000 | 60 | 37.6488 | 10.3357 | 90.0000 |
| 42.8326 | −1.7031 | 90.0000 | 61 | 38.3109 | 10.8233 | 90.0000 |
| 43.4295 | −0.8473 | 90.0000 | 62 | 38.9651 | 11.3209 | 90.0000 |
| 44.0124 | 0.0178 | 90.0000 | 63 | 39.6124 | 11.8287 | 90.0000 |
| 44.5814 | 0.8922 | 90.0000 | 64 | 40.2519 | 12.3457 | 90.0000 |
| 45.1388 | 1.7744 | 90.0000 | 65 | 40.8837 | 12.8721 | 90.0000 |
| 45.6829 | 2.6643 | 90.0000 | 66 | 41.5078 | 13.4078 | 90.0000 |
| 46.2155 | 3.5612 | 90.0000 | 67 | 42.1240 | 13.9527 | 90.0000 |
| 46.7364 | 4.4651 | 90.0000 | 68 | 42.7318 | 14.5062 | 90.0000 |
| 47.2473 | 5.3752 | 90.0000 | 69 | 43.3326 | 15.0682 | 90.0000 |
| 47.7465 | 6.2907 | 90.0000 | 70 | 43.9248 | 15.6388 | 90.0000 |
| 48.2364 | 7.2124 | 90.0000 | 71 | 44.5093 | 16.2171 | 90.0000 |
| 48.7163 | 8.1380 | 90.0000 | 72 | 45.0853 | 16.8039 | 90.0000 |
| 49.1876 | 9.0690 | 90.0000 | 73 | 45.6543 | 17.3984 | 90.0000 |
| 49.6504 | 10.0047 | 90.0000 | 74 | 46.2147 | 18.0000 | 90.0000 |
| 50.1039 | 10.9434 | 90.0000 | 75 | 46.7667 | 18.6093 | 90.0000 |
| 50.5504 | 11.8868 | 90.0000 | 76 | 47.3116 | 19.2256 | 90.0000 |
| 50.9891 | 12.8333 | 90.0000 | 77 | 47.8481 | 19.8488 | 90.0000 |
| 51.4209 | 13.7829 | 90.0000 | 78 | 48.3767 | 20.4783 | 90.0000 |
| 51.8457 | 14.7357 | 90.0000 | 79 | 48.8984 | 21.1147 | 90.0000 |
| 52.2643 | 15.6915 | 90.0000 | 80 | 49.4116 | 21.7566 | 90.0000 |
| 52.6775 | 16.6496 | 90.0000 | 81 | 49.9178 | 22.4054 | 90.0000 |
| 53.0837 | 17.6101 | 90.0000 | 82 | 50.4163 | 23.0589 | 90.0000 |
| 53.4845 | 18.5736 | 90.0000 | 83 | 50.9070 | 23.7186 | 90.0000 |
| 53.8806 | 19.5388 | 90.0000 | 84 | 51.3907 | 24.3837 | 90.0000 |
| 54.2713 | 20.5062 | 90.0000 | 85 | 51.8674 | 25.0543 | 90.0000 |
| 54.6574 | 21.4752 | 90.0000 | 86 | 52.3364 | 25.7295 | 90.0000 |
| 55.0380 | 22.4465 | 90.0000 | 87 | 52.7992 | 26.4093 | 90.0000 |
| 55.4155 | 23.4194 | 90.0000 | 88 | 53.2543 | 27.0946 | 90.0000 |
| 55.7876 | 24.3938 | 90.0000 | 89 | 53.7031 | 27.7837 | 90.0000 |
| 56.1566 | 25.3698 | 90.0000 | 90 | 54.1457 | 28.4767 | 90.0000 |
| 56.5217 | 26.3465 | 90.0000 | 91 | 54.5814 | 29.1736 | 90.0000 |
| 56.8837 | 27.3256 | 90.0000 | 92 | 55.0109 | 29.8752 | 90.0000 |
| 57.2419 | 28.3054 | 90.0000 | 93 | 55.4341 | 30.5806 | 90.0000 |
| 57.5961 | 29.2868 | 90.0000 | 94 | 55.8504 | 31.2899 | 90.0000 |
| 57.9473 | 30.2690 | 90.0000 | 95 | 56.2612 | 32.0023 | 90.0000 |
| 58.2953 | 31.2527 | 90.0000 | 96 | 56.6659 | 32.7178 | 90.0000 |
| 58.6411 | 32.2372 | 90.0000 | 97 | 57.0643 | 33.4372 | 90.0000 |
| 58.9837 | 33.2225 | 90.0000 | 98 | 57.4581 | 34.1597 | 90.0000 |
| 59.2527 | 34.2225 | 90.0000 | 99 | 57.8915 | 34.8527 | 90.0000 |
| 58.6612 | 35.0085 | 90.0000 | 100 | 58.6612 | 35.0085 | 90.0000 |
| −8.0543 | −7.0085 | 100.0000 | 1 | −8.0543 | −7.0085 | 100.0000 |
| −8.2853 | −8.0426 | 100.0000 | 2 | −7.6946 | −6.2426 | 100.0000 |
| −8.2457 | −9.1008 | 100.0000 | 3 | −7.2116 | −5.5481 | 100.0000 |
| −7.9620 | −10.1225 | 100.0000 | 4 | −6.6364 | −4.9271 | 100.0000 |
| −7.4884 | −11.0729 | 100.0000 | 5 | −5.9930 | −4.3767 | 100.0000 |
| −6.8798 | −11.9426 | 100.0000 | 6 | −5.2992 | −3.8915 | 100.0000 |
| −6.1744 | −12.7357 | 100.0000 | 7 | −4.5682 | −3.4636 | 100.0000 |
| −5.3977 | −13.4605 | 100.0000 | 8 | −3.8093 | −3.0876 | 100.0000 |
| −4.5682 | −14.1240 | 100.0000 | 9 | −3.0287 | −2.7589 | 100.0000 |
| −3.6992 | −14.7341 | 100.0000 | 10 | −2.2318 | −2.4736 | 100.0000 |
| −2.7969 | −15.2961 | 100.0000 | 11 | −1.4209 | −2.2271 | 100.0000 |
| −1.8698 | −15.8140 | 100.0000 | 12 | −0.6008 | −2.0163 | 100.0000 |
| −0.9209 | −16.2922 | 100.0000 | 13 | 0.2279 | −1.8403 | 100.0000 |
| 0.0457 | −16.7333 | 100.0000 | 14 | 1.0620 | −1.6938 | 100.0000 |
| 1.0271 | −17.1395 | 100.0000 | 15 | 1.8984 | −1.5636 | 100.0000 |
| 2.0217 | −17.5132 | 100.0000 | 16 | 2.7357 | −1.4326 | 100.0000 |
| 3.0271 | −17.8558 | 100.0000 | 17 | 3.5713 | −1.2969 | 100.0000 |
| 4.0419 | −18.1690 | 100.0000 | 18 | 4.4070 | −1.1574 | 100.0000 |
| 5.0659 | −18.4519 | 100.0000 | 19 | 5.2426 | −1.0163 | 100.0000 |
| 6.0984 | −18.7031 | 100.0000 | 20 | 6.0767 | −0.8729 | 100.0000 |
| 7.1380 | −18.9217 | 100.0000 | 21 | 6.9109 | −0.7256 | 100.0000 |
| 8.1837 | −19.1078 | 100.0000 | 22 | 7.7442 | −0.5736 | 100.0000 |
| 9.2349 | −19.2605 | 100.0000 | 23 | 8.5767 | −0.4186 | 100.0000 |
| 10.2907 | −19.3783 | 100.0000 | 24 | 9.4085 | −0.2589 | 100.0000 |
| 11.3504 | −19.4612 | 100.0000 | 25 | 10.2395 | −0.0946 | 100.0000 |
| 12.4116 | −19.5093 | 100.0000 | 26 | 11.0698 | 0.0752 | 100.0000 |
| 13.4736 | −19.5209 | 100.0000 | 27 | 11.8984 | 0.2496 | 100.0000 |
| 14.5357 | −19.4961 | 100.0000 | 28 | 12.7264 | 0.4295 | 100.0000 |
| 15.5961 | −19.4341 | 100.0000 | 29 | 13.5527 | 0.6155 | 100.0000 |
| 16.6543 | −19.3357 | 100.0000 | 30 | 14.3775 | 0.8070 | 100.0000 |
| 17.7078 | −19.2016 | 100.0000 | 31 | 15.2008 | 1.0054 | 100.0000 |
| 18.7566 | −19.0302 | 100.0000 | 32 | 16.0225 | 1.2109 | 100.0000 |
| 19.7984 | −18.8225 | 100.0000 | 33 | 16.8426 | 1.4233 | 100.0000 |
| 20.8318 | −18.5791 | 100.0000 | 34 | 17.6605 | 1.6426 | 100.0000 |
| 21.8574 | −18.3000 | 100.0000 | 35 | 18.4767 | 1.8698 | 100.0000 |
| 22.8721 | −17.9860 | 100.0000 | 36 | 19.2907 | 2.1047 | 100.0000 |
| 23.8760 | −17.6388 | 100.0000 | 37 | 20.1016 | 2.3481 | 100.0000 |
| 24.8674 | −17.2574 | 100.0000 | 38 | 20.9109 | 2.6000 | 100.0000 |
| 25.8465 | −16.8442 | 100.0000 | 39 | 21.7163 | 2.8605 | 100.0000 |
| 26.8116 | −16.4000 | 100.0000 | 40 | 22.5194 | 3.1295 | 100.0000 |
| 27.7612 | −15.9248 | 100.0000 | 41 | 23.3194 | 3.4085 | 100.0000 |
| 28.6969 | −15.4209 | 100.0000 | 42 | 24.1163 | 3.6961 | 100.0000 |
| 29.6163 | −14.8891 | 100.0000 | 43 | 24.9093 | 3.9938 | 100.0000 |
| 30.5194 | −14.3302 | 100.0000 | 44 | 25.6984 | 4.3016 | 100.0000 |
| 31.4070 | −13.7450 | 100.0000 | 45 | 26.4829 | 4.6194 | 100.0000 |
| 32.2767 | −13.1364 | 100.0000 | 46 | 27.2643 | 4.9473 | 100.0000 |
| 33.1302 | −12.5031 | 100.0000 | 47 | 28.0411 | 5.2853 | 100.0000 |
| 33.9667 | −11.8481 | 100.0000 | 48 | 28.8124 | 5.6341 | 100.0000 |
| 34.7860 | −11.1721 | 100.0000 | 49 | 29.5798 | 5.9938 | 100.0000 |

TABLE I-continued

| SUCTION-SIDE | | | | PRESSURE-SIDE | | |
| --- | --- | --- | --- | --- | --- | --- |
| X (%) | Y (%) | Z (%) | N | X (%) | Y (%) | Z (%) |
| 35.5884 | −10.4752 | 100.0000 | 50 | 30.3411 | 6.3636 | 100.0000 |
| 36.3729 | −9.7597 | 100.0000 | 51 | 31.0977 | 6.7450 | 100.0000 |
| 37.1411 | −9.0256 | 100.0000 | 52 | 31.8488 | 7.1372 | 100.0000 |
| 37.8922 | −8.2736 | 100.0000 | 53 | 32.5938 | 7.5395 | 100.0000 |
| 38.6264 | −7.5062 | 100.0000 | 54 | 33.3326 | 7.9535 | 100.0000 |
| 39.3434 | −6.7225 | 100.0000 | 55 | 34.0651 | 8.3783 | 100.0000 |
| 40.0442 | −5.9240 | 100.0000 | 56 | 34.7915 | 8.8147 | 100.0000 |
| 40.7295 | −5.1116 | 100.0000 | 57 | 35.5116 | 9.2612 | 100.0000 |
| 41.3977 | −4.2860 | 100.0000 | 58 | 36.2240 | 9.7194 | 100.0000 |
| 42.0504 | −3.4481 | 100.0000 | 59 | 36.9295 | 10.1876 | 100.0000 |
| 42.6876 | −2.5977 | 100.0000 | 60 | 37.6279 | 10.6667 | 100.0000 |
| 43.3093 | −1.7364 | 100.0000 | 61 | 38.3186 | 11.1566 | 100.0000 |
| 43.9155 | −0.8643 | 100.0000 | 62 | 39.0023 | 11.6574 | 100.0000 |
| 44.5085 | 0.0178 | 100.0000 | 63 | 39.6775 | 12.1682 | 100.0000 |
| 45.0868 | 0.9085 | 100.0000 | 64 | 40.3450 | 12.6899 | 100.0000 |
| 45.6519 | 1.8085 | 100.0000 | 65 | 41.0047 | 13.2209 | 100.0000 |
| 46.2039 | 2.7163 | 100.0000 | 66 | 41.6558 | 13.7628 | 100.0000 |
| 46.7442 | 3.6310 | 100.0000 | 67 | 42.2992 | 14.3140 | 100.0000 |
| 47.2721 | 4.5527 | 100.0000 | 68 | 42.9341 | 14.8744 | 100.0000 |
| 47.7884 | 5.4814 | 100.0000 | 69 | 43.5605 | 15.4450 | 100.0000 |
| 48.2938 | 6.4163 | 100.0000 | 70 | 44.1783 | 16.0240 | 100.0000 |
| 48.7884 | 7.3558 | 100.0000 | 71 | 44.7876 | 16.6124 | 100.0000 |
| 49.2736 | 8.3008 | 100.0000 | 72 | 45.3884 | 17.2093 | 100.0000 |
| 49.7496 | 9.2512 | 100.0000 | 73 | 45.9806 | 17.8147 | 100.0000 |
| 50.2155 | 10.2054 | 100.0000 | 74 | 46.5643 | 18.4287 | 100.0000 |
| 50.6736 | 11.1643 | 100.0000 | 75 | 47.1395 | 19.0504 | 100.0000 |
| 51.1240 | 12.1264 | 100.0000 | 76 | 47.7054 | 19.6806 | 100.0000 |
| 51.5659 | 13.0930 | 100.0000 | 77 | 48.2636 | 20.3178 | 100.0000 |
| 52.0008 | 14.0620 | 100.0000 | 78 | 48.8124 | 20.9628 | 100.0000 |
| 52.4279 | 15.0349 | 100.0000 | 79 | 49.3535 | 21.6147 | 100.0000 |
| 52.8488 | 16.0101 | 100.0000 | 80 | 49.8860 | 22.2729 | 100.0000 |
| 53.2636 | 16.9884 | 100.0000 | 81 | 50.4109 | 22.9380 | 100.0000 |
| 53.6729 | 17.9690 | 100.0000 | 82 | 50.9264 | 23.6101 | 100.0000 |
| 54.0752 | 18.9519 | 100.0000 | 83 | 51.4341 | 24.2876 | 100.0000 |
| 54.4729 | 19.9372 | 100.0000 | 84 | 51.9341 | 24.9713 | 100.0000 |
| 54.8651 | 20.9240 | 100.0000 | 85 | 52.4256 | 25.6612 | 100.0000 |
| 55.2519 | 21.9140 | 100.0000 | 86 | 52.9093 | 26.3566 | 100.0000 |
| 55.6349 | 22.9047 | 100.0000 | 87 | 53.3860 | 27.0574 | 100.0000 |
| 56.0124 | 23.8977 | 100.0000 | 88 | 53.8543 | 27.7628 | 100.0000 |
| 56.3860 | 24.8922 | 100.0000 | 89 | 54.3163 | 28.4729 | 100.0000 |
| 56.7566 | 25.8884 | 100.0000 | 90 | 54.7705 | 29.1876 | 100.0000 |
| 57.1225 | 26.8853 | 100.0000 | 91 | 55.2178 | 29.9070 | 100.0000 |
| 57.4845 | 27.8845 | 100.0000 | 92 | 55.6581 | 30.6302 | 100.0000 |
| 57.8434 | 28.8845 | 100.0000 | 93 | 56.0915 | 31.3581 | 100.0000 |
| 58.1984 | 29.8853 | 100.0000 | 94 | 56.5171 | 32.0907 | 100.0000 |
| 58.5496 | 30.8884 | 100.0000 | 95 | 56.9364 | 32.8264 | 100.0000 |
| 58.8984 | 31.8915 | 100.0000 | 96 | 57.3488 | 33.5659 | 100.0000 |
| 59.2442 | 32.8961 | 100.0000 | 97 | 57.7550 | 34.3093 | 100.0000 |
| 59.5868 | 33.9016 | 100.0000 | 98 | 58.1558 | 35.0558 | 100.0000 |
| 59.9008 | 34.9147 | 100.0000 | 99 | 58.6256 | 35.7496 | 100.0000 |
| 59.4287 | 35.8000 | 100.0000 | 100 | 59.4287 | 35.8000 | 100.0000 |

It will also be appreciated that the airfoil 52 disclosed in the above Table I may be scaled up or down geometrically for use in other similar turbine designs. Consequently, the coordinate values set forth in Table I may be scaled upwardly or downwardly such that the airfoil profile shape remains unchanged. A scaled version of the coordinates in Table I would be represented by X, Y and Z coordinate values of Table I, with the X, Y and Z non-dimensional coordinate values converted to inches, multiplied or divided by a constant number.

An important term in this disclosure is "profile". The profile is the range of the variation between measured points on an airfoil surface and the ideal position listed in Table I. The actual profile on a manufactured turbine nozzle will be different than those in Table I and the design is robust to this variation meaning that mechanical and aerodynamic function are not impaired. As noted above, a + or −5% profile tolerance is used herein. The X, Y and Z values are all non-dimensionalized relative to the airfoil height.

The disclosed airfoil shape optimizes and is specific to the machine conditions and specifications. It provides a unique profile to achieve 1) interaction between other stages in the turbine 10; 2) aerodynamic efficiency; and 3) normalized aerodynamic and mechanical nozzle or airfoil loadings. The disclosed loci of points defined in Table I allow the gas turbine 12 or any other suitable turbine to run in an efficient, safe and smooth manner. As also noted, any scale of the disclosed airfoil 52 may be adopted as long as 1) interaction between other stages in the pressure turbine 10; 2) aerodynamic efficiency; and 3) normalized aerodynamic and mechanical nozzle or airfoil loadings are maintained in the scaled turbine.

The airfoil 52 described herein thus improves overall gas turbine 12 efficiency. Specifically, the airfoil 52 provides a desired turbine efficiency lapse rate (ISO, hot, cold, part load, etc.). The airfoil 52 also meets all aeromechanics and stress requirements. The turbine nozzle 50 described herein has very specific aerodynamic design requirements such as an upstream bucket radial back pressure (i.e., work splits) and radial velocity triangles for the downstream turbine rotors 150, 250, 350 and 450. Significant cross-functional design effort was require to meet these design goals. The airfoil 52 of the turbine nozzle 50 thus is of a specific shape to meet aerodynamic, mechanical, and heat transfer requirements in an efficient and cost effective manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine nozzle comprising: an airfoil shape, the airfoil shape having a nominal profile substantially in accordance with Cartesian coordinate values of X, Y and Z set forth in Table I, wherein the Cartesian coordinate values of X, Y and Z are non-dimensional values from 0% to 100% convertible to dimensional distances in inches by multiplying the Cartesian coordinate values of X, Y and Z by a height of the airfoil in inches, and wherein X and Y, when connected by smooth continuing arcs, define airfoil profile sections at each distance Z, the airfoil profile sections at Z distances being joined smoothly with one another to form a complete airfoil shape.

2. The turbine nozzle of claim 1, wherein the turbine nozzle forms part of a stage of a turbine.

3. The turbine nozzle of claim 1, wherein the turbine nozzle is a third stage turbine nozzle.

4. The turbine nozzle of claim 1, wherein the airfoil shape lies in an envelope within at least one of +/−5% and/or +/−5% of a chord length in a direction normal to any airfoil surface location.

5. The turbine nozzle of claim 1, wherein a height of the turbine nozzle is about 5 inches to about 20 inches (about 12 centimeters to about 51 centimeters) in length.

6. The turbine nozzle of claim 1, wherein the X, Y and Z distances are scalable as a function of the same constant or number to provide a scaled-up or scaled-down airfoil.

7. A turbine nozzle comprising: an airfoil having a suction-side uncoated nominal airfoil profile substantially in accordance with suction-side Cartesian coordinate values of X, Y and Z set forth in Table I, wherein the Cartesian coordinate values of X, Y and Z are non-dimensional values from 0% to 100% convertible to dimensional distances in inches by multiplying the Cartesian coordinate values of X, Y and Z by a height of the airfoil in inches, and wherein X and Y, when connected by smooth continuing arcs, define airfoil profile sections at each Z distance, the airfoil profile sections at the Z distances being joined smoothly with one another to form a complete suction-side airfoil shape, the X, Y and Z distances being scalable as a function of the same constant or number to provide a scaled-up or scaled-down airfoil.

8. The turbine nozzle of claim 7, wherein the turbine nozzle forms part of a stage of a turbine.

9. The turbine nozzle of claim 7, wherein the turbine nozzle is a third stage turbine nozzle.

10. The turbine nozzle of claim 7, wherein the airfoil shape lies in an envelope within at least one of +/−5% and/or +/−5% of a chord length in a direction normal to any airfoil surface location.

11. The turbine nozzle of claim 7, wherein a height of the turbine nozzle is about 5 inches to about 20 inches (about 12 centimeters to about 51 centimeters) in length.

12. A turbine comprising: a plurality of turbine nozzles, each of the turbine nozzles comprising an airfoil having an airfoil shape, the airfoil having a nominal profile substantially in accordance with Cartesian coordinate values of X, Y and Z set forth in Table I, wherein the Cartesian coordinate values of X, Y and Z are non-dimensional values from 0% to 100% convertible to dimensional distances in inches by multiplying the Cartesian coordinate values of X, Y and Z by a height of the airfoil in inches, and wherein X and Y, when connected by smooth continuing arcs, define airfoil profile sections at each Z distance, the airfoil profile sections at Z distances being joined smoothly with one another to form a complete airfoil shape.

13. The turbine of claim 12, wherein the plurality of turbine nozzles forms part of a stage of a turbine.

14. The turbine of claim 12, wherein the plurality of turbine nozzles comprises a plurality of third stage turbine nozzles.

15. The turbine of claim 12, wherein the airfoil shape lies in an envelope within at least one of +/−5% and/or +/−5% of a chord length in a direction normal to any airfoil surface location.

16. The turbine of claim 12, wherein a height the turbine nozzle is about 5 inches to about 20 inches (about 12 centimeters to about 51 centimeters) in length.

17. The turbine of claim 12, wherein the X, Y and Z distances are scalable as a function of the same constant or number to provide a scaled-up or scaled-down airfoil.

18. The turbine of claim 12, wherein X represents a distance parallel to a turbine axis of rotation.

* * * * *